US010915613B2

(12) United States Patent
Himabindu et al.

(10) Patent No.: US 10,915,613 B2
(45) Date of Patent: Feb. 9, 2021

(54) INTELLIGENT DYNAMIC AUTHENTICATION SYSTEM

(71) Applicant: Bank of America Corporation, Charlotte, NC (US)

(72) Inventors: Keesara Himabindu, Farmers Branch, TX (US); Jayachandra Varma, Irving, TX (US); Crystal M. Sundaramoorthy, Charlotte, NC (US); Gilbert M. Gatchalian, Union, NJ (US); Manu Kurian, Dallas, TX (US); Kevin A. Delson, Woodland Hills, CA (US); Saritha Prasad Vrittamani, Plano, TX (US); Angela Cain, Rowlett, TX (US)

(73) Assignee: Bank of America Corporation, Charlotte, NC (US)

( * ) Notice: Subject to any disclaimer, the term of this patent is extended or adjusted under 35 U.S.C. 154(b) by 212 days.

(21) Appl. No.: 16/106,259

(22) Filed: Aug. 21, 2018

(65) Prior Publication Data

US 2020/0065459 A1 Feb. 27, 2020

(51) Int. Cl.
*G06N 5/04* (2006.01)
*G06F 21/32* (2013.01)
(Continued)

(52) U.S. Cl.
CPC ............. *G06F 21/32* (2013.01); *G06N 20/00* (2019.01); *H04L 9/3271* (2013.01); *H04L 63/0861* (2013.01)

(58) Field of Classification Search
CPC ....... G06F 21/32; G06F 21/316; G06N 20/00; G06N 5/00; G06N 5/02; G06N 3/08; H04L 9/3271; H04L 63/0861; H04L 9/3231; H04L 2463/082; H04L 9/3273; H04L 63/0869; H04L 63/10
See application file for complete search history.

(56) References Cited

U.S. PATENT DOCUMENTS 7,822,666 B1 10/2010 Bursch
8,294,552 B2 10/2012 Beenau et al.
(Continued)

*Primary Examiner* — Abu S Sholeman
(74) *Attorney, Agent, or Firm* — Banner & Witcoff, Ltd.; Michael A. Springs

(57) ABSTRACT

Systems for dynamic authentication are provided. In some examples, a system may receive a request to process an event. In some examples, the request to process the event may include additional details associated with the event. The system may initiate dynamic authentication functions and may retrieve data from a plurality of sources. In some examples, the data from the plurality of sources may be analyzed using machine learning to dynamically generate authentication data, such as one or more authentication questions. The system may also generate one or more corresponding responses or answers to the one or more authentication questions. In some examples, the one or more authentication questions may be transmitted to a user device or other device and may be displayed to the user. The user may provide authentication response data that may be analyzed by the system to determine whether it matches the generated response or answer. If so, the user may be authenticated and/or the event may be processed.

15 Claims, 22 Drawing Sheets

(51) Int. Cl.
    *H04L 9/32*         (2006.01)
    *H04L 29/06*       (2006.01)
    *G06N 20/00*      (2019.01)

(56) References Cited

U.S. PATENT DOCUMENTS

| | | |
|---|---|---|
| 8,336,091 B2 | 12/2012 | Wong |
| 8,380,637 B2 | 2/2013 | Levovitz |
| 8,442,894 B2 | 5/2013 | Blackhurst et al. |
| 8,683,562 B2 | 3/2014 | Ting et al. |
| 9,519,901 B1 | 12/2016 | Dorogusker |
| 9,813,402 B1* | 11/2017 | Chen .................... G06F 21/316 |
| 10,680,823 B2* | 6/2020 | Grajek .................... G06F 21/32 |
| 2008/0133434 A1* | 6/2008 | Asar ...................... G06N 20/00 |
| | | 706/12 |
| 2015/0287255 A1 | 10/2015 | Hendrick |
| 2017/0004483 A1 | 1/2017 | Runyan et al. |
| 2017/0024739 A1 | 1/2017 | Todasco et al. |
| 2017/0289127 A1 | 10/2017 | Hendrick |
| 2018/0235763 A1* | 8/2018 | Meneghini ............ A61F 2/3609 |
| 2018/0253985 A1* | 9/2018 | Aggarwal ............. H04L 67/306 |
| 2019/0171977 A1* | 6/2019 | Kurian .................. G06N 20/00 |
| 2019/0188374 A1* | 6/2019 | Arunkumar ........... G06F 21/316 |
| 2019/0377853 A1* | 12/2019 | Obaidi .................. G06N 20/00 |
| 2020/0014673 A1* | 1/2020 | Morgantini ........... H04L 63/107 |

\* cited by examiner

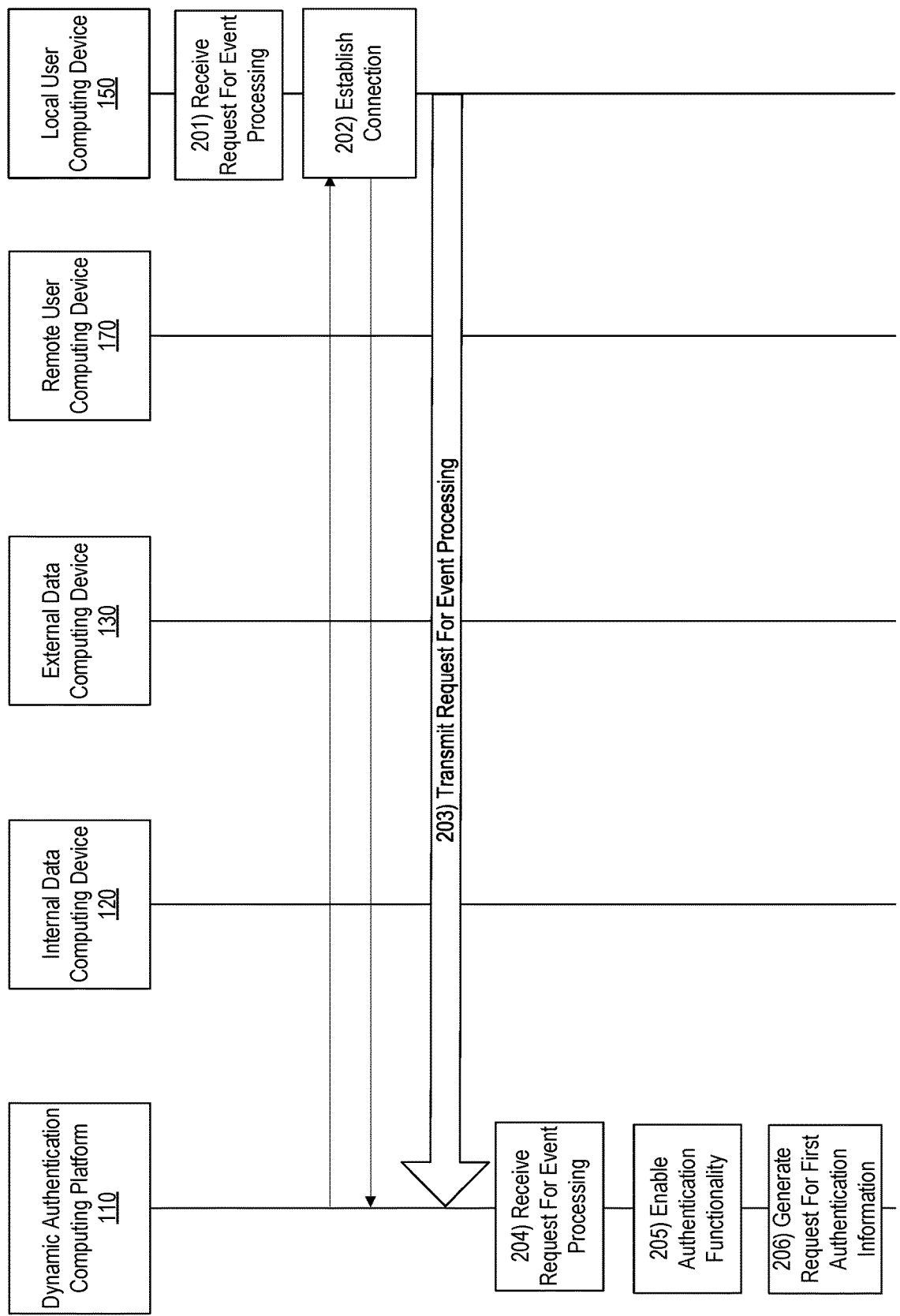

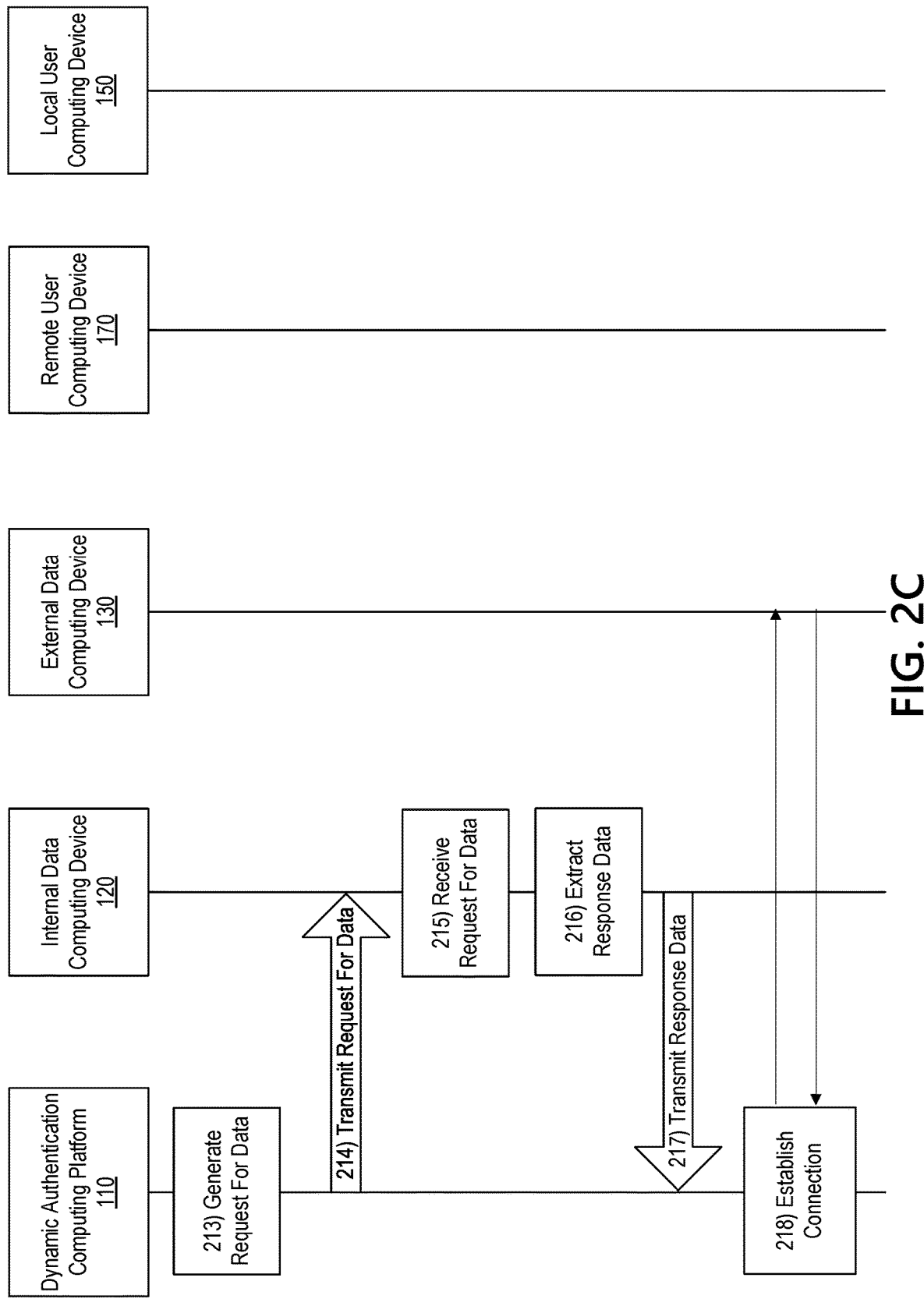

INTELLIGENT DYNAMIC AUTHENTICATION SYSTEM

BACKGROUND

Aspects of the disclosure relate to electrical computers, systems, and machine learning. In particular, one or more aspects of the disclosure relate to using machine learning to dynamically generate authentication data for use in authenticating users.

Protecting user data is of significant importance to users. Conventional arrangements rely on static authentication data that involves pre-stored questions and answers provided by the user in advance and pre-stored. Use of these static authentication functions may provide opportunities for unauthorized users to access the authentication information and use the authentication information in unauthorized activities. For instance, the more often a same answer to a same challenge question is provided, the more opportunities an unauthorized user has to access the data. Accordingly, it would be advantageous to provide dynamically generated authentication information for use in processing various types of events in order to increase security of event processing.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with securely processing events.

In some examples, a system, computing platform, or the like, may receive a request to process an event. In some examples, the request to process the event may include additional details associated with the event. The system, computing platform or the like, may initiate dynamic authentication functions and may retrieve data from a plurality of sources. In some examples, the data from the plurality of sources may be analyzed using machine learning to dynamically generate authentication data, such as one or more authentication questions. The system, computing platform, or the like, may also generate one or more corresponding responses or answers to the one or more authentication questions.

In some examples, the one or more authentication questions may be transmitted to a user device or other device and may be displayed to the user. The user may provide authentication response data that may be analyzed by the system, computing platform, or the like, to determine whether it matches the generated response or answer. If so, the user may be authenticated and/or the event may be processed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing dynamic authentication functions in accordance with one or more aspects described herein;

DETAILED DESCRIPTION

Figure 1A:
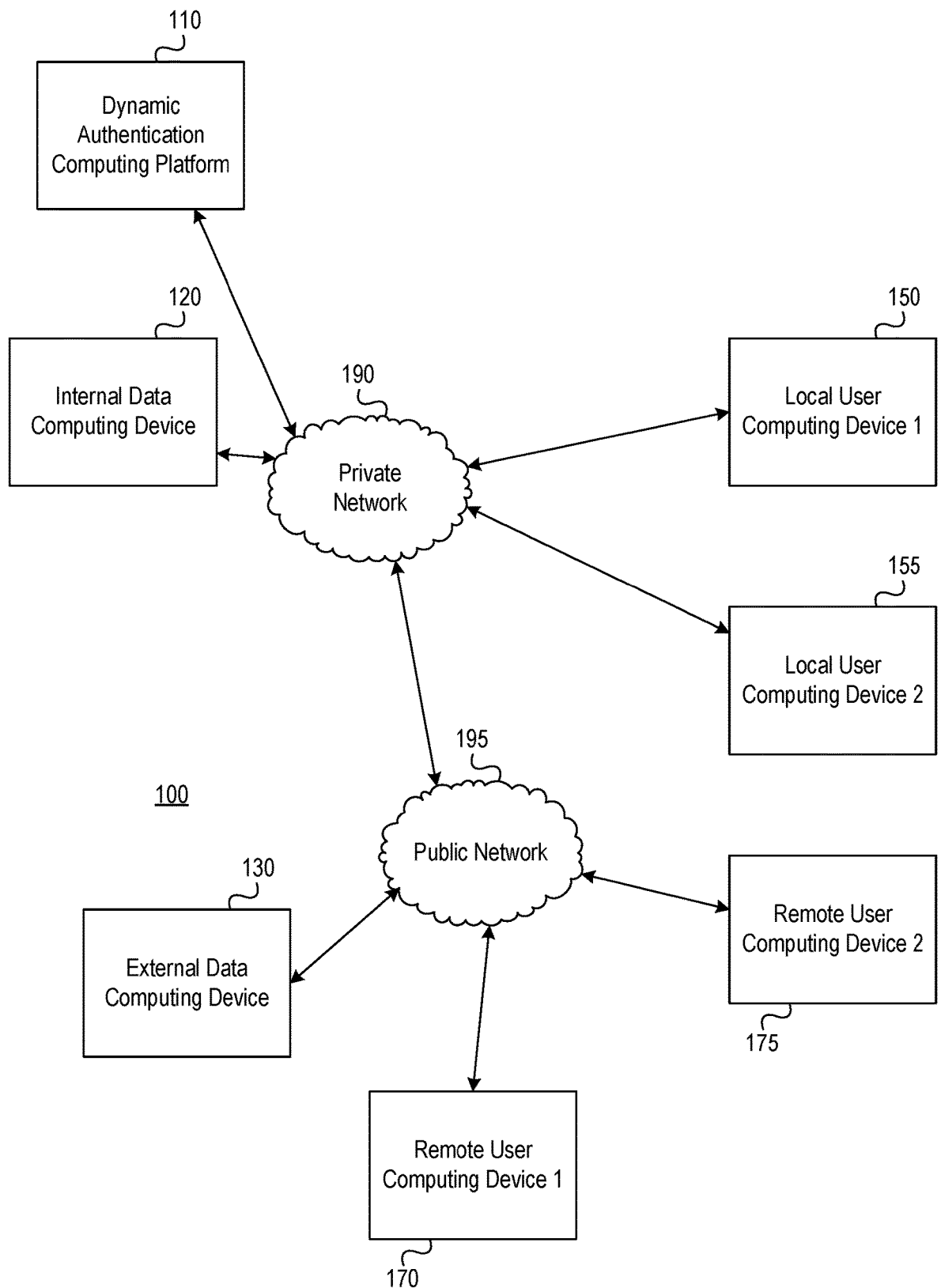
FIGS. 1A and 1B depict an illustrative computing environment for implementing dynamic authentication functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to dynamically generate one or more authentication questions and corresponding responses or answers for use in authenticating a user. Some aspects related to temporarily storing biometric data for use in authentication functions and processes and using unique codes transmitted to one or more users for authentication.

As mentioned above, controlling access to data, money, personal information, and the like, is of utmost importance to people. Accordingly, authentication functions are critical in today's world in which people are processing events in many different ways. Conventional authentication arrangements rely on static data, such as pre-generated challenge questions presented to the user in advance and with answers or responses provided by the user and pre-stored. These conventional arrangements provide minimal security for users because each use of the challenge question and response provides an opportunity for an unauthorized user to obtain the information and use it in an unauthorized manner. Accordingly, ever-changing authentication questions, such as those described herein, provide additional security and reduce or eliminate opportunities for unauthorized users to use the information for unauthorized purposes.

Accordingly, aspects described herein are related to dynamically generating authentication questions in real-time in order to provide an ever changing array of authentication questions. In some examples, a dynamically generated authentication question may be used only one time and then might never be used again. Additionally or alternatively, the dynamically generated authentication questions may be used again but the corresponding response or answer may change based on data used to generate the authentication question.

For instance, data from a plurality of sources may be received and may be processed using machine learning to generate, dynamically and in real-time, one or more authentication questions. The system may also generate corresponding answers or responses. Upon receiving a request to process an event (e.g., access and automated teller machine (ATM), process a transaction, or the like), the system may retrieve data, dynamically generate the authentication question and transmit it to the user. The user may then provide response data based on, for instance, his current location, facts generally known to the user, and the like.

In some additional aspects, one or more unique authentication codes may be generated and transmitted to the user. For instance, a first user may register with a system and one or more unique authentication codes may be generated and transmitted to one or more computing devices associated with the first user and a second user. In some examples, the first user may be a supervisory user and the second user may be a user attempting or requesting to process an event. Upon requesting processing of the event, the system may request that each user provide the respective authentication code in order to authenticate the user and process the event.

In still other examples, a user may register with the system to provide use of biometric data temporarily stored for use in authenticating a user. For instance, a user may submit biometric data that may be temporarily (e.g., 1 day, 2 hours, 1 week, or the like) stored by a system. Upon receiving a request to process an event, the user may submit biometric response data to authenticate. The system may determine whether the pre-stored biometric data is active and has not expired. If so, it may be compared to the biometric response data and, if a match exists, the user may be authenticated. Once the time period has expired, the biometric data may be deleted from the system.

These and various other arrangements will be discussed more fully below.

Figure 1B:
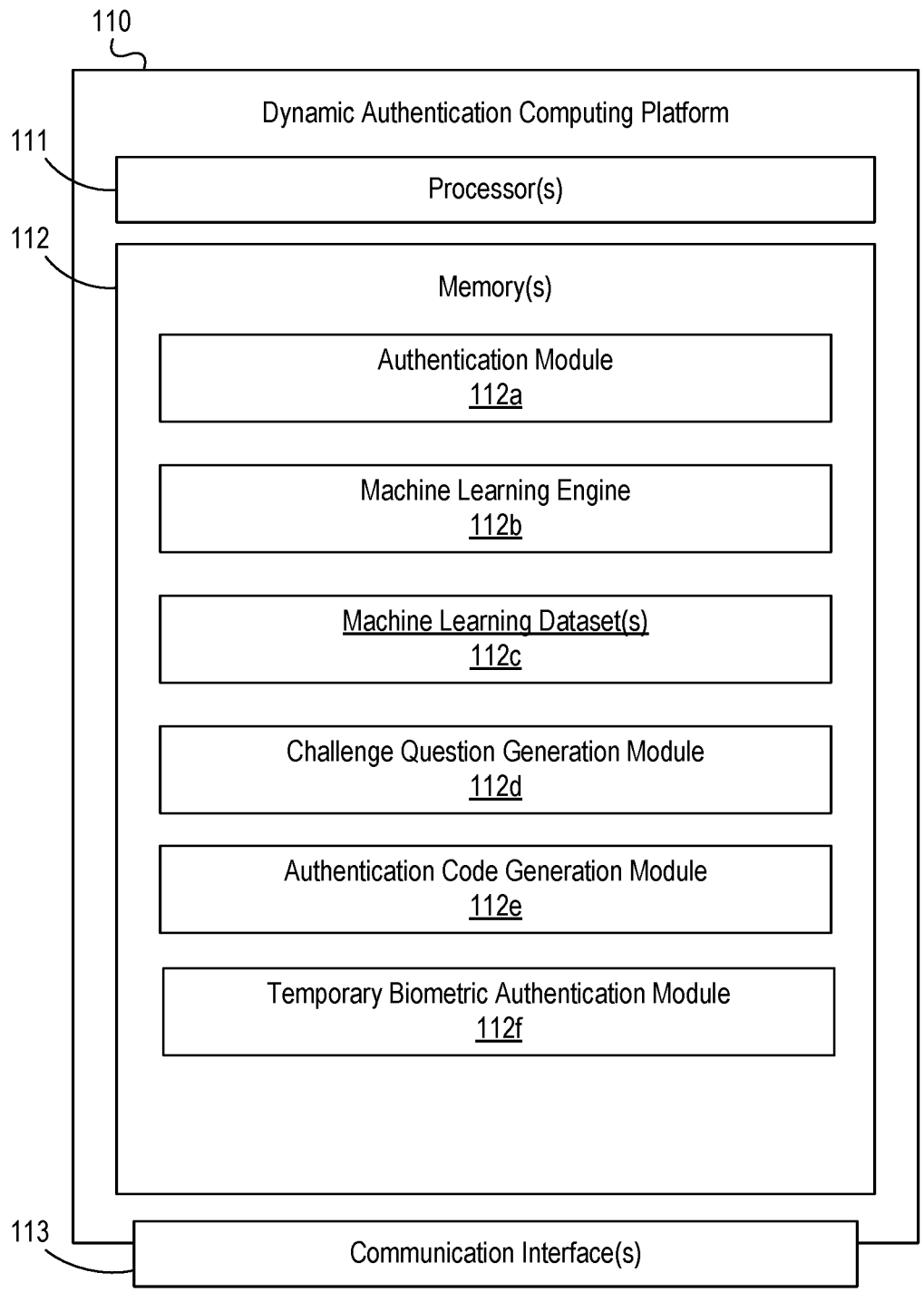

FIGS. 1A and 1B depict an illustrative computing environment for implementing and using a system for intelligent dynamic authentication in accordance with one or more aspects described herein. Referring to FIG. 1A, computing environment 100 may include one or more computing devices and/or other computing systems. For example, computing environment 100 may include a dynamic authentication computing platform 110, an internal data computing device 120, an external data computing device 130, a first local user computing device 150, a second local user computing device 155, a first remote user computing device 170, and a second remote user computing device 175.

Dynamic authentication computing platform 110 may be configured to host and/or execute a machine learning engine to provide intelligent, dynamic authentication functions. In some examples, a request to authenticate a user or process an event may be received. In some examples, authentication may include a first authentication factor and a second authentication factor. For instance, in response to the authentication or event processing request, a request for a username, personal identification number (PIN), password, or the like, may be transmitted to the user. In response to receiving the requesting information, a request for second authentication information may be transmitted to the user. In some examples, the second authentication factor may include one or more intelligent, dynamic authentication aspects described herein. In other examples, a single authentication factor may be used and may include one or more of the intelligent, dynamic authentication aspects described herein.

Responsive to receiving the request for authentication or event processing, the dynamic authentication computing platform 110 may receive data from one or more sources, such as internal data computing device 120, external data computing device 130, or the like. The data may include data related to a user, such as account information of the user, transaction history of the user, contact information of the user, and the like. The data may also include data such as a current location of a user (e.g., based on global positioning system (GPS) data from a mobile device of the user), previous activity of a user (e.g., from social media, GPS, or the like), and the like.

The dynamic authentication computing platform 110 may analyze the received data, e.g., using a machine learning engine and one or more machine learning datasets, to dynamically generate one or more authentication questions to be presented to the user. In some examples, the authentication questions may be generated responsive to the current user request for authentication or event processing. Accordingly, in such examples, the authentication question(s) are not pre-generated questions having pre-stored answers provided by a user. Rather, the authentication question(s) are dynamically generated based on data from various sources and machine learning to provide a constantly changing and personalized form of authentication for the user. In some examples, the questions may have never been previously seen by the user and/or the responses may not be previously known to the user.

The generated authentication question(s) may be transmitted to the user and response data may be analyzed to determine whether the user is authenticated. If so, an event or other process requested by the user may proceed. If not, the user may be prevented from processing the transaction or other process requested.

Internal data computing device 120 may be configured to store, transmit, and/or receive data associated with one or more internal data or computer systems. For instance, an entity implementing the dynamic authentication computing platform 110 may store data associated with various users, account information, contact information, mobile device identifying information (e.g., international mobile equipment identity (IMEI)), event processing history including, for instance, transaction history, and the like. The internal data computing device 120 may retrieve data from one or more databases or other data storage locations within the entity implementing the dynamic authentication computing platform 110.

External data computing device 130 may be configured to store, transmit, and/or receive data associated with one or more data or computer systems external to the entity implementing the dynamic authentication computing platform 110. For instance, data, such as publicly available data, event data including, for instance, transaction data (e.g., user transactions not associated with the entity), user demographic data, social media data, market data, location data (e.g., GPS from a user mobile device), and the like, may be transmitted, via the external data computing device 130, from one or more data or computer systems, to the dynamic authentication computing platform 110 and may be used to generate one or more authentication questions, evaluate responses to one or more authentication questions, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes (e.g., local computing device 150, 155 may be an automated teller machine (ATM), self-service kiosk, or the like). In some examples, local user computing device 150, 155 may be used to access the dynamic authentication computing platform 110 to request authentication, provide responses to authentication data and/or question requests, and the like. In still other examples, local user computing device 150, 155 may be used to control aspects of dynamic authentication computing platform 110, modify settings, or the like.

The remote user computing devices 170, 175 may be used to communicate with, for example, dynamic authentication computing platform 110, receive and display notifications or other data, and the like. In some examples, remote user computing devices 170, 175 may be used to request authentication. For instance, remote user computing devices 170, 175 may be a mobile device of a user (e.g., being used to process a transaction via an application executing on the device or the like), a point-of-sale system at a merchant or vendor at which a transaction is being requested and authentication information is needed, or the like.

In one or more arrangements, internal data computing device 120, external data computing device 130, local user computing device 150, local user computing device 155, remote user computing device 170, and/or remote user computing device 175 may be any type of computing device or combination of devices capable of performing the particular functions described herein. For example, internal data computing device 120, external data computing device 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 120, external data computing device 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic authentication computing platform 110. As illustrated in greater detail below, dynamic authentication computing platform 110 may include one or more computing devices configured to perform one or more of the functions described herein. For example, dynamic authentication computing platform 110 may include one or more computers (e.g., laptop computers, desktop computers, servers, server blades, or the like).

As mentioned above, computing environment 100 also may include one or more networks, which may interconnect one or more of dynamic authentication computing platform 110, internal data computing device 120, external data computing device 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic authentication computing platform 110, internal data computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic authentication computing platform 110, internal data computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic authentication computing platform 110, internal data computing device 120, local user computing device 150, local user computing device 155) with one or more networks and/or computing devices that are not associated with the organization. For example, external data computing device 130, remote user computing device 170, and/or remote user computing device 175 might not be associated with an organization that operates private network 190 (e.g., because external data computing device 130, remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect external data computing device 130, remote user computing device 170 and remote user computing device 175 to private network 190 and/or one or more computing devices connected thereto (e.g., dynamic authentication computing platform 110, internal data computing device 120, local user computing device 150, local user computing device 155).

Referring to FIG. 1B, dynamic authentication computing platform 110 may include one or more processors 111, memory 112, and communication interface 113. A data bus may interconnect processor(s) 111, memory 112, and communication interface 113. Communication interface 113 may be a network interface configured to support communication between dynamic authentication computing platform 110 and one or more networks (e.g., private network 190, public network 195, or the like). Memory 112 may include one or more program modules having instructions that when executed by processor(s) 111 cause dynamic authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic authentication computing platform 110 and/or by different computing devices that may form and/or otherwise make up dynamic authentication computing platform 110.

For example, memory 112 may have, store, and/or include an authentication module 112*a*. Authentication module 112*a* may store instructions and/or data that may cause or enable the dynamic authentication computing platform 110 to receive a request to authenticate a user and process the request. For instance, the authentication module 112*a* may receive a request to authenticate a user or process an event from a computing device, such as local user computing devices 150, 155 or remote user computing devices 170, 175. In some examples, the request to authenticate the user may be received with a request to process a transaction or enable a function or process. For instance, a user may insert an ATM card into an ATM to enable functionality of the ATM. This information may be transmitted to the authentication module 112*a* as a request for authentication. In another example, a user may process a transaction using a payment device, such as an application executing on a mobile device, a credit card, debit card, or the like. This request for a transaction may be transmitted to the authentication module 112*a* as a request for authentication.

The authentication module 112*a* may, in examples in which two factor authentication is used, transmit a request for first authentication information. The request may include a request for a username, PIN, password, or the like. First authentication information response data may be received by the authentication module 112*a* and the authentication module 112*a* may determine whether the response data matches pre-stored authentication information (e.g., password, username, and the like). If so, second authentication request information may be generated. In examples in which single factor authentication is used, the authentication module 112*a* may, in conjunction with other modules, generate and transmit requests for authentication information.

Dynamic authentication computing platform 110 may further have, store or include a machine learning engine a machine learning engine 112*b* and machine learning datasets 112*c*. Machine learning engine 112*b* and machine learning datasets 112*c* may store instructions and/or data that may cause or enable dynamic authentication computing platform 110 to receive data from a plurality of sources (e.g., internal data computing device 120, external data computing device 130, and the like) to generate one or more authentication questions or authentication requests. The machine learning datasets 112*c* may be generated based on analyzed data (e.g., data from previously received data, data from internal data computing device 120, data from external data computing device 130, and the like), raw data, and/or received from one or more outside sources.

The machine learning engine 112*b* may receive data (e.g., data from internal data computing device 120, external data computing device 130, and the like) and, using one or more machine learning algorithms, may generate one or more machine learning datasets 112*c*. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112*b* may analyze data to identify patterns of activity, sequences of activity, and the like, to generate one or more machine learning datasets 112*c*.

The machine learning datasets 112*c* may include machine learning data linking one or more user characteristics, data elements, or the like to a user, a user authentication question, or the like. Accordingly, the machine learning datasets 112*c* may be used to dynamically generate authentication questions or requests for information that are not static but, instead, are constantly changing. In some examples, a same authentication question or request for data may not be used more than once. In other examples, depending on a nature of the authentication question or request for data, a same authentication question or request for data may be generated more than once but an answer needed to authenticate the user may be different depending on the data used to generate the authentication question or request for data.

The machine learning datasets 112*c* may be updated and/or validated based on subsequent data received, for example, after an authentication question has been answered, after a request for authentication data response has been received, and the like.

The machine learning datasets 112*c* may be used by, for example, challenge or authentication question generation module 112*d*. Challenge or authentication question generation module 112*d* may have or store instructions and/or data that may cause or enable dynamic authentication computing platform 110 to dynamically generate one or more challenge or authentication questions based on the data received, machine learning datasets 112*c*, and the like. For instance, the dynamically generated challenge or authentication question(s) may include questions related to a current location of a user (e.g., based on GPS data from a mobile device of the user), requests specific to a type of function or process being requested (e.g., a particular string of digits in an account number if a user is attempting a withdrawal), or the like.

The challenge or authentication question generation module 112*d* may also generate one or more acceptable responses for authenticating a user. For instance, based on the received data and one or more machine learning datasets, the challenge or authentication question generation module 112*d* may generate one or more challenge or authentication questions to be transmitted to the user. In addition, the challenge or authentication question generation module 112*d* may generate one or more responses that may be stored for comparison to response data received from the user. If response data matches the generated responses, the user may be authenticated. If not, the user may be notified of the failed authentication attempt and/or prevented from processing an event, enabling functionality, or the like.

Once the challenge or authentication question is generated, the authentication module 112*a* may transmit the challenge or authentication question to a computing device, such as a mobile device of a user. Upon receiving response data from the mobile device of the user, the authentication module 112*a* may process the received response data to determine whether a match exists between the response data and data associated with the challenge or authentication question. For instance, the authentication module 112a may compare the response data to the acceptable responses generated by the challenge or authentication question generation module 112d. If a match exists, the user may be authenticated and a process or event may be enabled or processed. If a match does not exist, a notification may be generated and transmitted to the user indicating the failed authentication attempt.

In some examples, machine learning datasets 112c may be used to evaluate response data to determine whether a match exists. For instance, the machine learning datasets 112c may be used to determine whether response data sufficiently matches the generated response (e.g., is within an acceptable matching threshold).

In addition to or alternatively to generating authentication or challenge questions, the dynamic authentication computing platform 110 may also generate other types of authentication requests. For instance, dynamic authentication computing platform 110 may have, store and/or include authentication code generation module 112e. Authentication code generation module 112e may store instructions and/or data that may cause or enable the dynamic authentication computing platform 110 to, in response to a request to authenticate a user, generate one or more authentication codes. In some examples, the generated authentication codes may be transmitted to one or more devices with instructions to input the code in order to authenticate the user. In some examples, to authenticate a user to process a single event, multiple different codes may be generated and transmitted to computing devices associated with multiple different users (e.g., a mobile device of a first user requesting the authentication and a mobile device of a second, different user that may be identified as a supervising user). In those examples, the system may require input of each code in order to authenticate the user and process the requested event. The codes may be transmitted to the user device (e.g., by authentication module 112a) and response data may be received and analyzed by the authentication module 112a in order to authenticate the user.

Dynamic authentication computing platform 110 may further have, store and/or include a temporary biometric authentication module 112f. Temporary biometric authentication module 112f may store instructions that may cause or enable the dynamic authentication computing platform 110 to generate temporary biometric data for use in authentication processes. For instance, a user may pre-register with the system and may provide biometric data for use in authentication. For instance, a user may provide a fingerprint, iris scan, voice print, or the like. The biometric data may be stored by the temporary biometric data authentication module 112f for a predetermined time period (e.g., 1 day, 4 hours, 30 days, or the like). During the time period for which the biometric data is stored, the authentication module 112a may request biometric data from a user in order to authenticate a user and may compare received biometric data to the stored biometric data in order to determine whether the user should be authenticated. After expiration of the predetermined time period, the stored biometric data may be deleted by the temporary biometric authentication module 112f such that biometric data can no longer be used to authenticate the user without again providing biometric data for storage and comparison.

FIGS. 2A-2F depict an illustrative event sequence for implementing and using dynamic authentication functions in accordance with one or more aspects described herein. The events shown in the illustrative event sequence are merely one example sequence and additional events may be added, or events may be omitted, without departing from the invention.

Referring to FIG. 2A, at step 201, a request to process an event may be received. For instance, the request may include a request to access functionality (e.g., at an ATM), a request to process a transaction (e.g., at a point-of-sale system), or the like. Although the request is shown as being received by the local user computing device 150, in some examples, the request may be received via remote user computing device 170 (e.g., when a transaction is being processed via a payment application executing on a mobile device of the user, when a user is attempting to access functionality provided by an application executing on the mobile device or an online application, or the like) or remote user computing device 175 (e.g., a point-of sale system, or the like).

At step 202, a connection may be established between the local user computing device 150 and the dynamic authentication computing platform 110. For instance, a first wireless connection may be established between the local user computing device 150 and the dynamic authentication computing platform 110. Upon establishing the first wireless connection, a communication session may be initiated between the dynamic authentication computing platform 110 and the local user computing device 150.

At step 203, the received request for event processing may be transmitted from the local user computing device 150 to the dynamic authentication computing platform 110. In some examples, the request for event processing may include additional data, such as a user requesting the event processing, a type of event, an amount (if any) associated with the event, and the like.

At step 204, the request for event processing may be received by the dynamic authentication computing platform 110 and, at step, 205, authentication functionality may be enabled. For instance, one or more functions associated with authentication may be enabled, activated or initiated by the dynamic authentication computing platform 110 (e.g., functions that were previously disabled or not available).

At step 206, a first request for authentication information may be generated. In some examples, the first request may be a first of two or more requests (e.g., in multi-factor authentication arrangements). In other examples, the first request for authentication data may be omitted and only the dynamic authentication request (discussed more fully below) may be generated and transmitted. In examples in which more than one authentication is requested, the first authentication information request may include a request for a username, PIN, password, or the like.

Figure 2B:
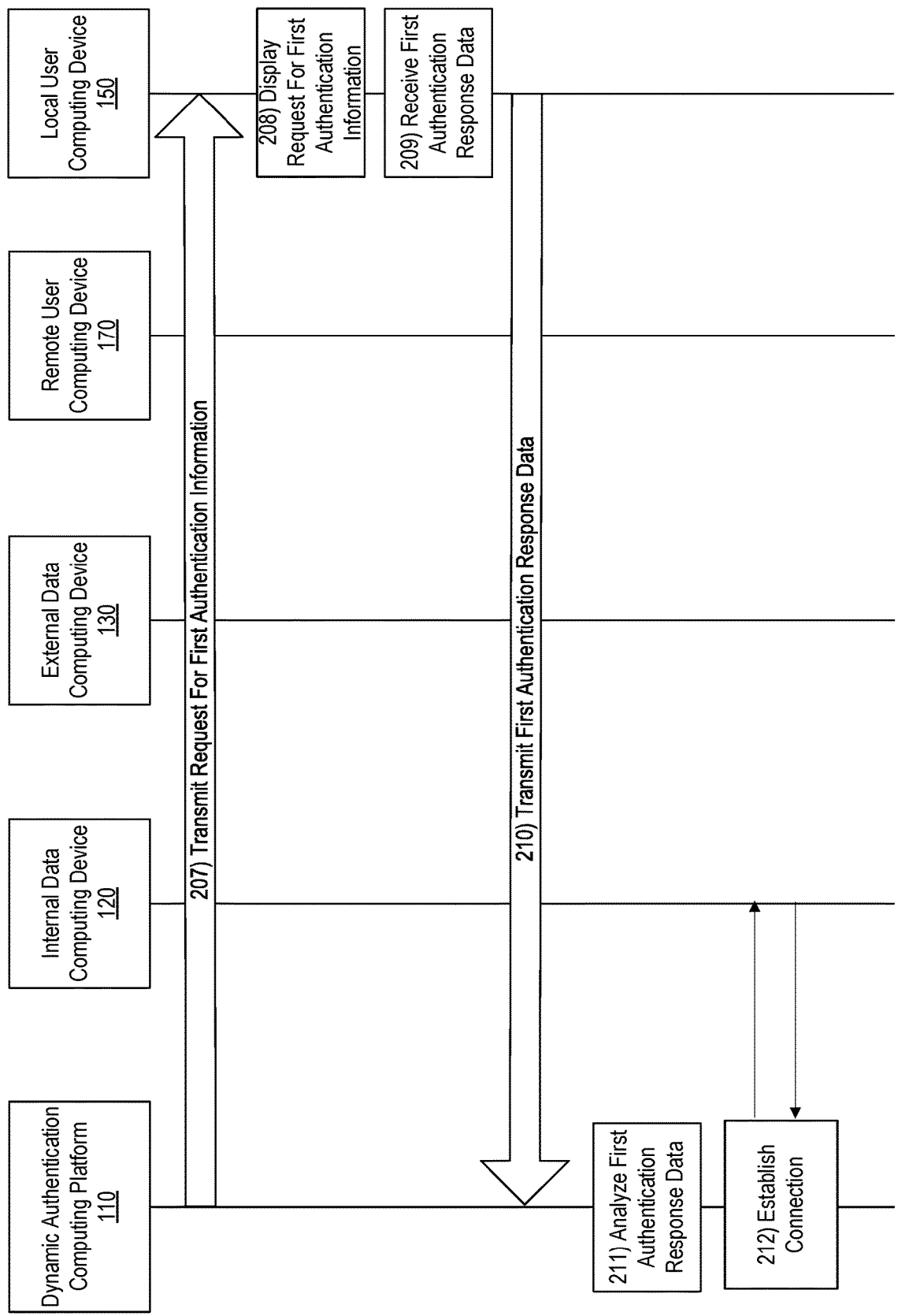

With reference to FIG. 2B, at step 207, the first request for authentication information may be transmitted to the local user computing device 150. In some examples, the first request for authentication information may be transmitted during the communication initiated when the first wireless communication session was established. Further, in examples in which the request to process the event was received from the remote user computing device 170 or remote computing device 175, the request for authentication information may be transmitted to the remote user computing device 170 or remote user computing device 175.

At step 208, the request for first authentication information may be received and displayed by the local user computing device 150. At step 209, first authentication response data may be received by the local user computing device 150. For instance, in response to the displayed request for first authentication information, the user may input response data to the local user computing device 150 or to a mobile device that may transmit the response data to the local user computing device.

At step 210, the first authentication response data may be transmitted from the local user computing device 150 to the dynamic authentication computing platform 110. At step 211, the first authentication response data may be received by the dynamic authentication computing platform 110 and may be analyzed to determine whether the response data matches pre-stored authentication data (e.g., whether a username, PIN, password, or the like matches pre-stored data).

If the received first authentication response data does not match pre-stored data, the user might not be authenticated and, instead, a notification may be transmitted to the local user computing device 150 denying or preventing the processing of the requested event and/or providing a notification that the user was not authenticated.

If the received first authentication response data does match pre-stored data, the dynamic authentication computing platform 110 may initiate a process to generate a dynamic request for additional authentication data. For instance, at step 212, a connection may be established between the internal data computing device 120 and the dynamic authentication computing platform 110. For instance, a second wireless connection may be established between the internal data computing device 120 and the dynamic authentication computing platform 110. Upon establishing the second wireless connection, a communication session may be initiated between the dynamic authentication computing platform 110 and the internal data computing device 120.

With reference to FIG. 2C, at step 213, a request for data may be generated. For instance, the dynamic authentication computing platform 110 may generate a request for data. The request may include a request for data associated with the user requesting processing of the event, such as an account number, account balance, transaction history, and the like.

At step 214, the generated request for data may be transmitted to the internal data computing device 120. For instance, in some examples, the generated request for data may be transmitted to the internal data computing device 120 during the communication session initiated when the second wireless connection was established.

At step 215, the request for data may be received by the internal data computing device 120. At step 216, data responsive to the request may be extracted. For instance, data responsive to the request may be extracted from one or more databases associated with or in communication with the internal data computing device 120. In some examples, a user name or other identifier (e.g., from the initial request for event processing) may be used as input in a query to identify and extract response data.

At step 217, the extracted response data may be transmitted to the dynamic authentication computing platform 110. For instance, the extracted response data may be transmitted during the communication session initiated when the second wireless connection was established.

At step 218, a connection may be established between the external data computing device 130 and the dynamic authentication computing platform 110. For instance, a third wireless connection may be established between the external data computing device 130 and the dynamic authentication computing platform 110. Upon establishing the third wireless connection, a communication session may be initiated between the dynamic authentication computing platform 110 and the external data computing device 130.

Figure 2D:
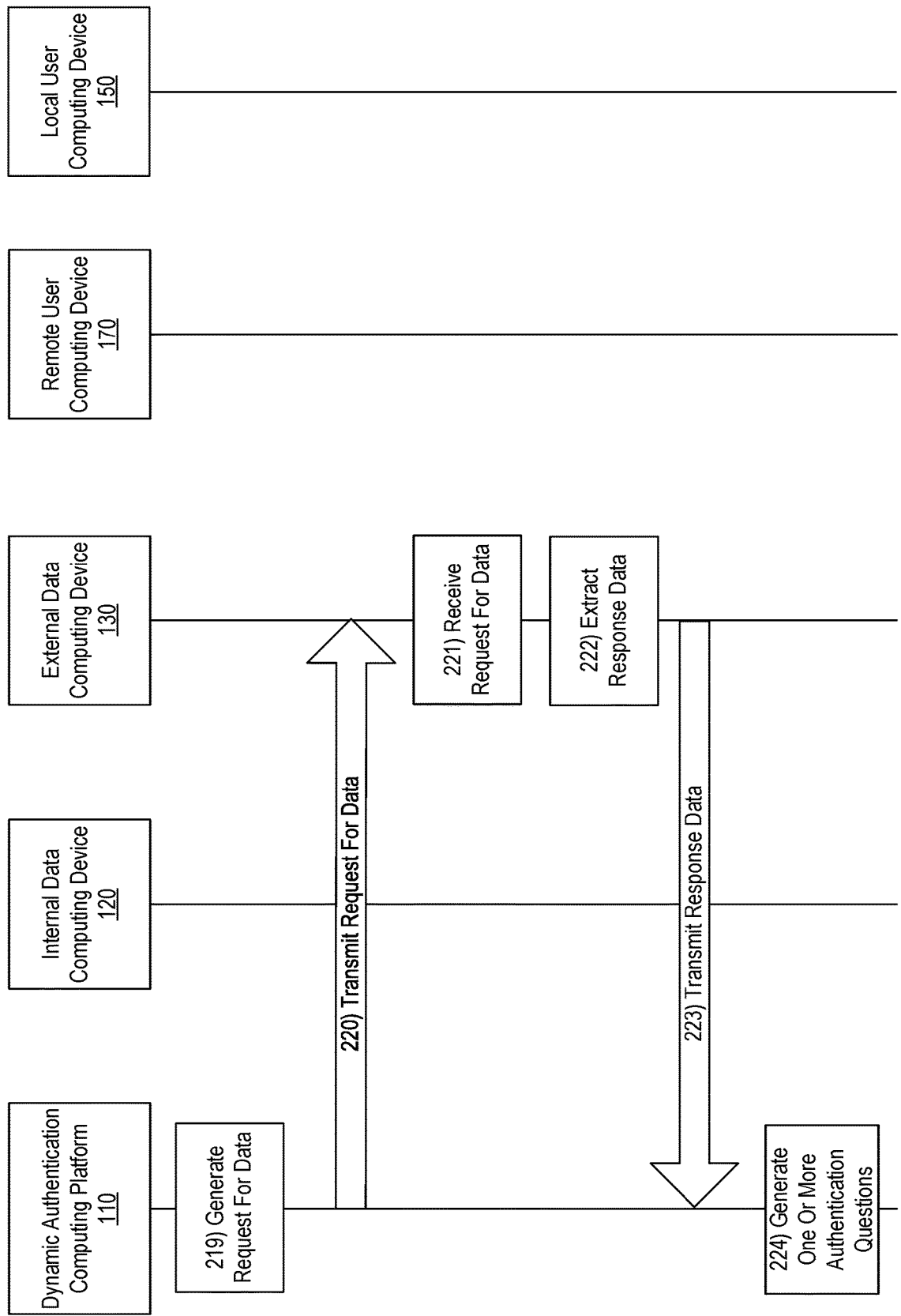

With reference to FIG. 2D, at step 219, a request for data may be generated. For instance, the dynamic authentication computing platform 110 may generate a request for data. The request may include a request for data associated with the user requesting processing of the event and available from external sources, such as a current location of the user (e.g., via GPS data from a mobile device of the user), transaction history of the user, demographic information, social media data, and the like.

At step 220, the generated request for data may be transmitted to the external data computing device 130. For instance, in some examples, the generated request for data may be transmitted to the external data computing device 130 during the communication session initiated when the second wireless connection was established.

At step 221, the request for data may be received by the external data computing device 130. At step 222, data responsive to the request may be extracted. For instance, data responsive to the request may be extracted from one or more databases associated with or in communication with the external data computing device 130. In some examples, a user name or other identifier (e.g., from the initial request for event processing) may be used as input in a query to identify and extract response data. In some examples, the external data computing device 130 may connect to one or more other devices to obtain the requested data (e.g., may connect to a mobile device of a user to obtain current GPS data).

At step 223, the extracted response data may be transmitted from the external data computing device 130 to the dynamic authentication computing platform 110. For instance, the extracted response data may be transmitted during the communication session initiated when the third wireless connection was established.

At step 224, the response data may be received by the dynamic authentication computing platform 110 and may be analyzed using one or more machine learning datasets. The dynamic authentication computing platform 110 may then dynamically generate one or more authentication or challenge questions. For instance, the dynamically generated challenge or authentication questions may be generated in real-time or near real-time and may be based on the received response data. Such an arrangement provides for virtually endless options for subject matter for authentication questions and ensures questions and/or responses may be dynamic, rather than static questions in conventional systems with pre-stored answers.

In addition to generating the authentication questions, the dynamic authentication computing platform 110 may also generate one or more acceptable responses to authenticate the user. The one or more acceptable responses may also be based on the response data received.

Figure 2E:
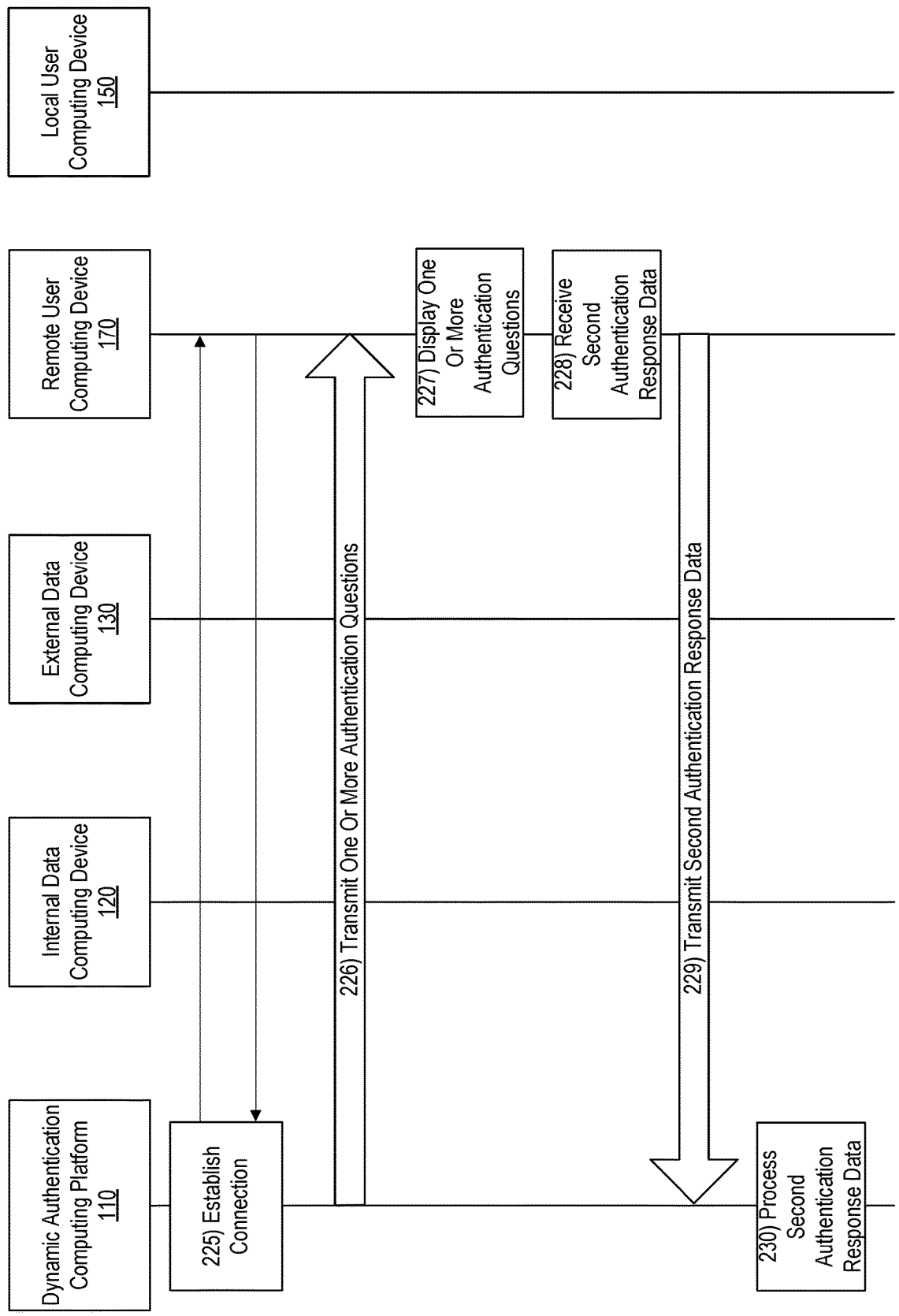

With reference to FIG. 2E, at step 225, a connection may be established between the remote user computing device 170 and the dynamic authentication computing platform 110. For instance, a fourth wireless connection may be established between the remote user computing device 170 and the dynamic authentication computing platform 110. Upon establishing the fourth wireless connection, a communication session may be initiated between the dynamic authentication computing platform 110 and the remote user computing device 170.

At step 226, the generated one or more authentication questions may be transmitted from the dynamic authentication computing platform 110 to the remote user computing device 170. For instance, the generated one or more authentication questions may be transmitted during the communication session initiated when the fourth wireless connection was established.

Although the example described herein includes transmitting the authentication questions to the remote user computing device 170, in some examples, the authentication questions may be transmitted to the local user computing device 150.

At step 227, the one or more authentication or challenge questions may be displayed via a display of a remote user computing device 170. In some examples, the authentication or challenge question may include a single, dynamically generated question based on the data received and analyzed. In other examples, the authentication or challenge questions may include more than one question. In some arrangements, the questions may be answered in any order. In other arrangements, the questions may be presented and/or responses may be received in sequence in order to authenticate the user.

At step 228, second authentication response data may be received via the remote user computing device 170. For instance, the user may provide user input responding to the one or more authentication or challenge questions via a user interface on the display.

At step 229, the second authentication response data may be transmitted from the remote user computing device 170 to the dynamic authentication computing platform 110. In some examples, the second authentication response data may be transmitted during the communication session initiated when the fourth wireless connection was established.

At step 230, the second authentication data may be received by the dynamic authentication computing platform 110 and may be processed by the dynamic authentication computing platform 110. For instance, the second authentication response data may be compared to responses dynamically generated by the dynamic authentication computing platform 110 when the authentication or challenge questions were generated. As discussed herein, in at least some examples, the authentication questions and responses might not be pre-generated or pre-stored. Rather, the authentication questions and responses may be generated by the dynamic authentication computing platform 110 in response to a request to process an event or a request to authenticate a user. Further, in at least some examples, the dynamically generated authentication or challenge questions and/or responses may be generated solely by the dynamic authentication computing platform 110 and without user input.

If the received second authentication response data does not match the responses generated by the dynamic authentication computing platform 110, the request to process the event may be denied and/or processing the event may be prevented. The user may also be notified.

Figure 2F:
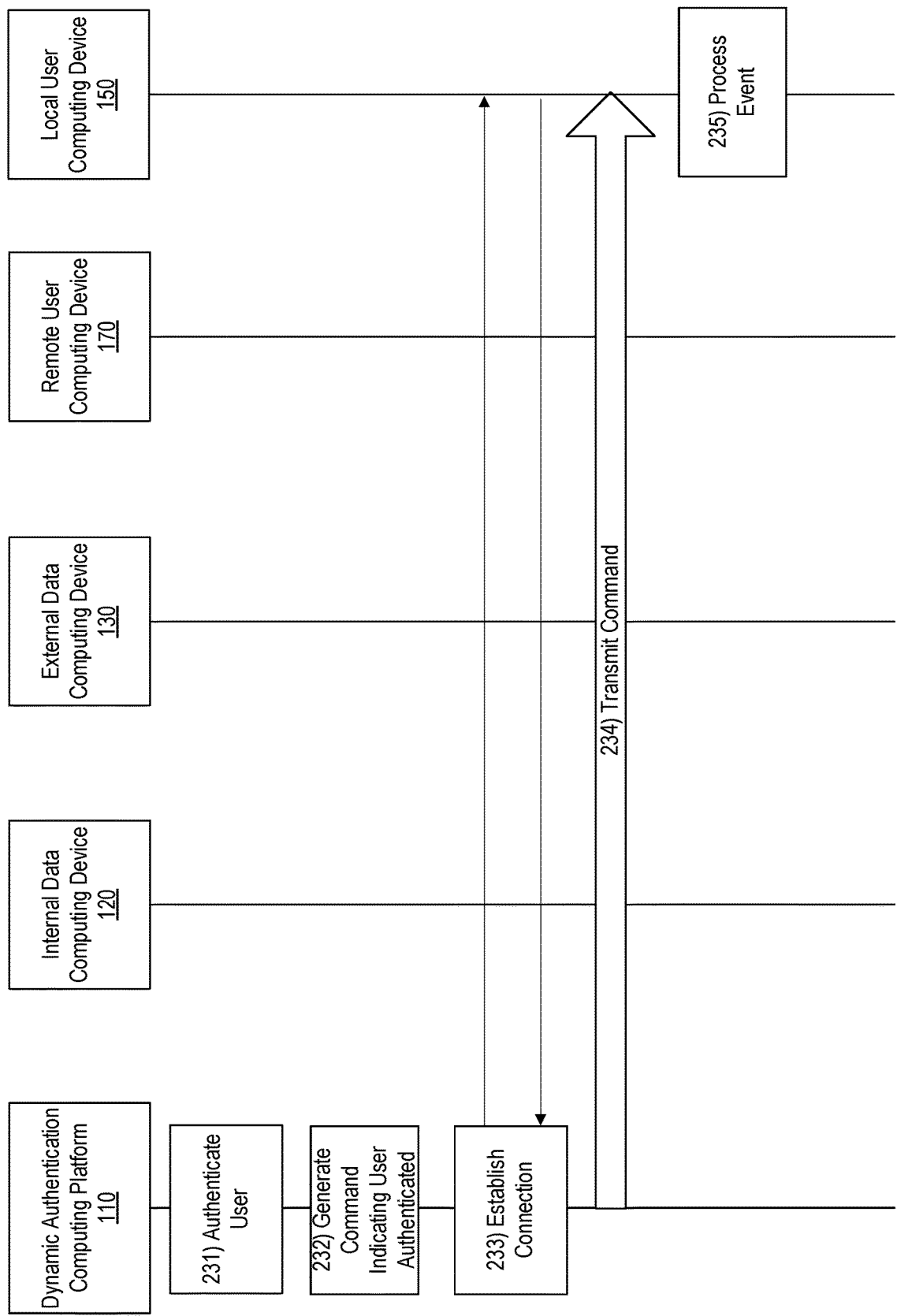

If the received second authentication response data matches the responses generated by the dynamic authentication computing platform 110, the user may be authenticated in step 231 in FIG. 2F.

At step 232, an instruction or command may be generated to cause the event to be processed. The instruction or command may include an indication that the user has been authenticated.

At step 233, a connection may be established between the dynamic authentication computing platform 110 and the local user computing device 150. For instance, a fifth wireless connection may be established between the local user computing device 150 and the dynamic authentication computing platform 110. Upon establishing the fifth wireless connection, a communication session may be initiated between the dynamic authentication computing platform 110 and the local user computing device 150. In some examples, the first wireless connection may still be established and the communication session maintained. In those examples, step 233 may be omitted.

At step 234, the command or instruction may be transmitted to the local user computing device 150 and at step 235, the event may be processed.

FIGS. 3A-3F depict another illustrative event sequence for implementing and using dynamic authentication functions in accordance with one or more aspects described herein. The events shown in the illustrative event sequence are merely one example sequence and additional events may be added, or events may be omitted, without departing from the invention.

Figure 3A:
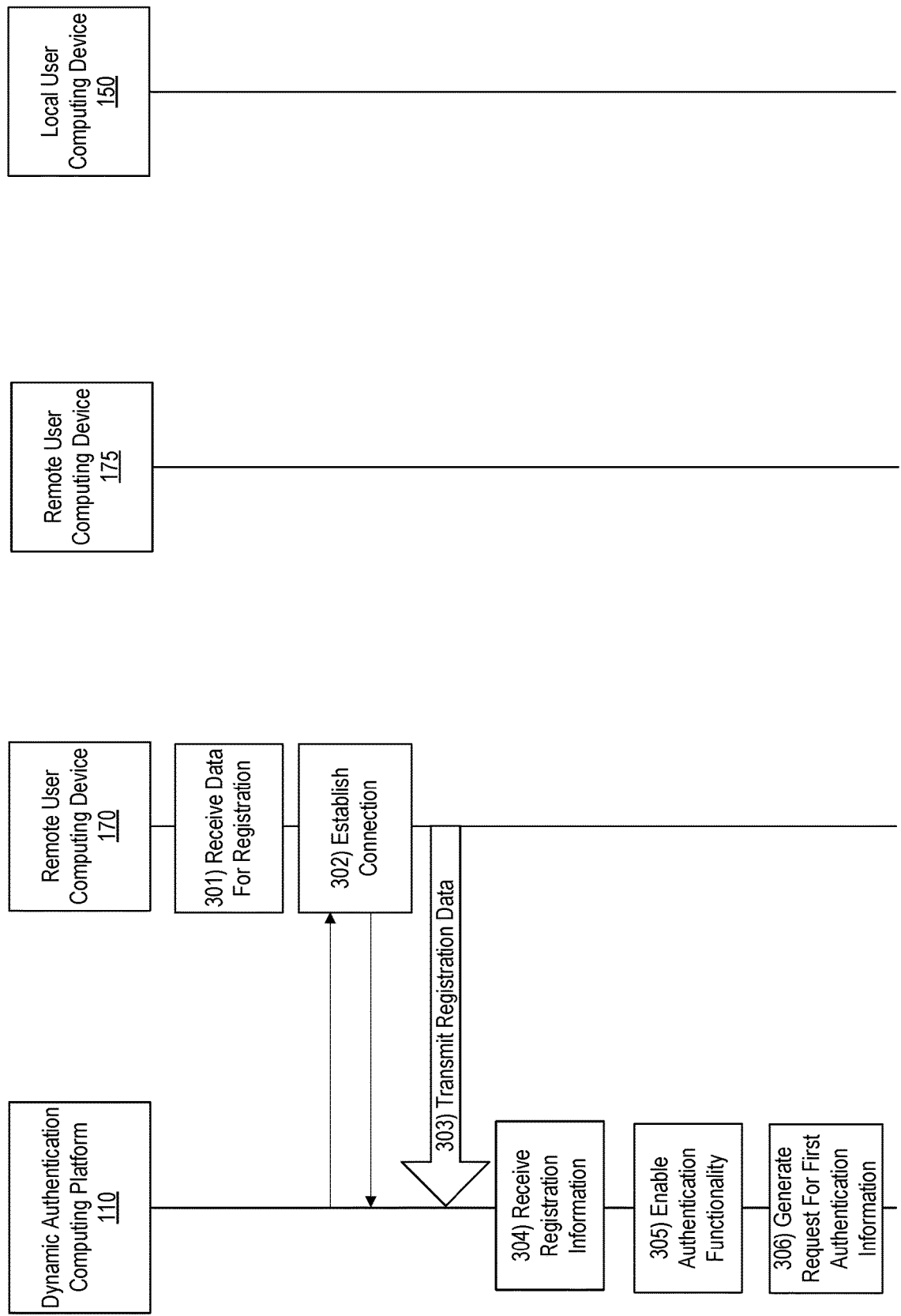
FIGS. 3A-3F depict another illustrative event sequence for implementing dynamic authentication functions in accordance with one or more aspects described herein.

Referring to FIG. 3A, at step 301, registration information may be received by, for example, remote user computing device 170. For instance, a user may open or otherwise cause an application to execute on the remote user computing device 170 that enables a user to register with, for instance, the dynamic authentication computing platform 110. In some examples, the registration information may include a name of the user or other identifier associated with the user, contact information, any parameters for use (e.g., types of events to be processed with additional authentication aspects, or the like), or the like.

At step 302, a connection may be established between the remote user computing device 170 and the dynamic authentication computing platform 110. For instance, a first wireless connection may be established between the remote user computing device 170 and the dynamic authentication computing platform 110. Upon establishing the first wireless connection, a communication session may be initiated between the dynamic authentication computing platform 110 and the remote user computing device 170.

At step 303, the received registration information may be transmitted to the dynamic authentication computing platform 110. In some examples, the registration information may include a request for registration. At step 304, the dynamic authentication computing platform 110 may receive the registration information and request.

At step 305, authentication functionality may be enabled. For instance, one or more functions associated with authentication may be enabled, activated or initiated by the dynamic authentication computing platform 110 (e.g., functions that were previously disabled or not available).

At step 306, a first request for authentication information may be generated. In some examples, the first request may be a first of two or more requests (e.g., in multi-factor authentication arrangements). In other examples, the first request for authentication data may be omitted and only the dynamic authentication request (discussed more fully below) may be generated and transmitted. In examples in which more than one authentication is requested, the first authentication information request may include a request for a username, PIN, password, or the like.

Figure 3B:
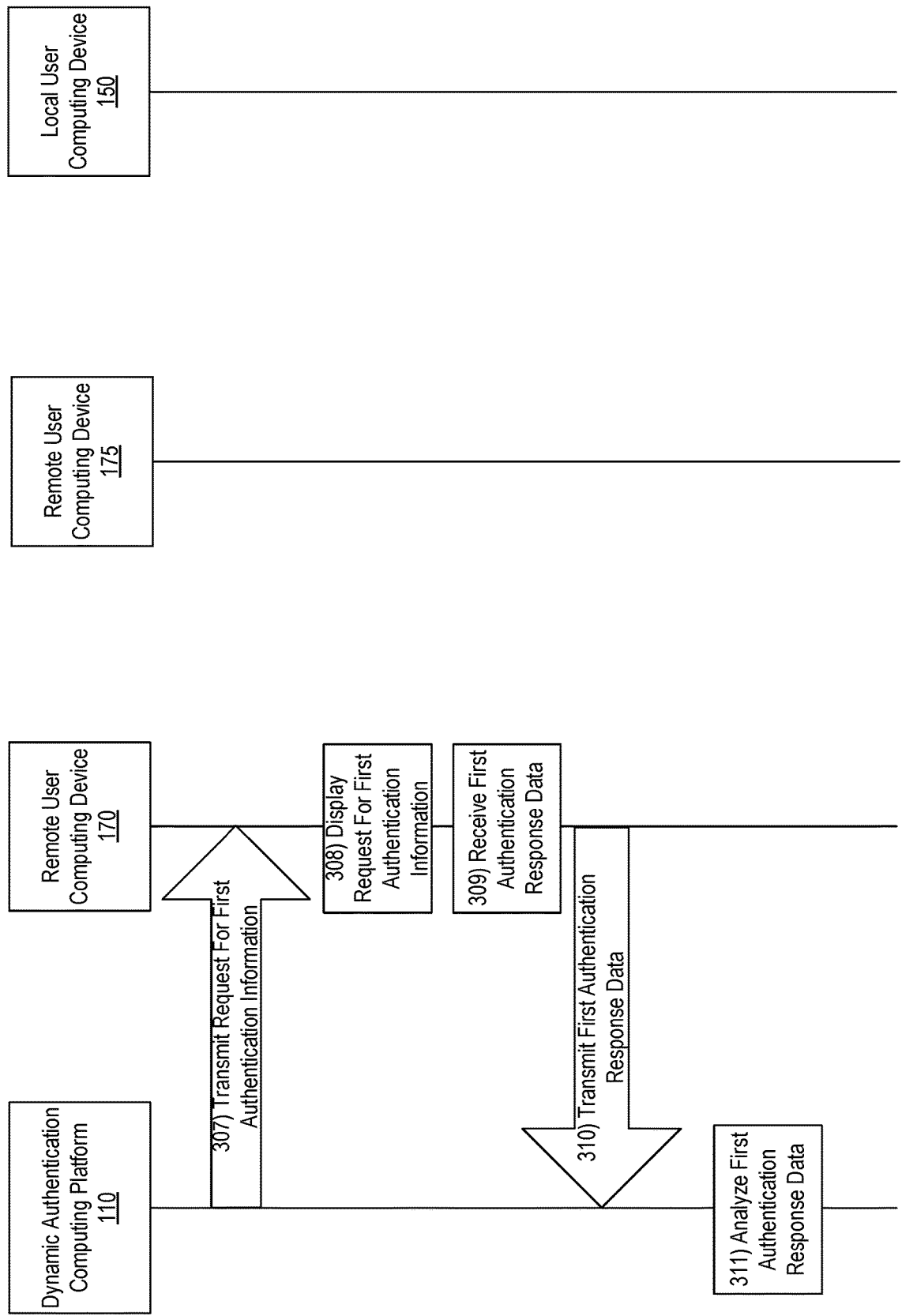
Figure 3C:
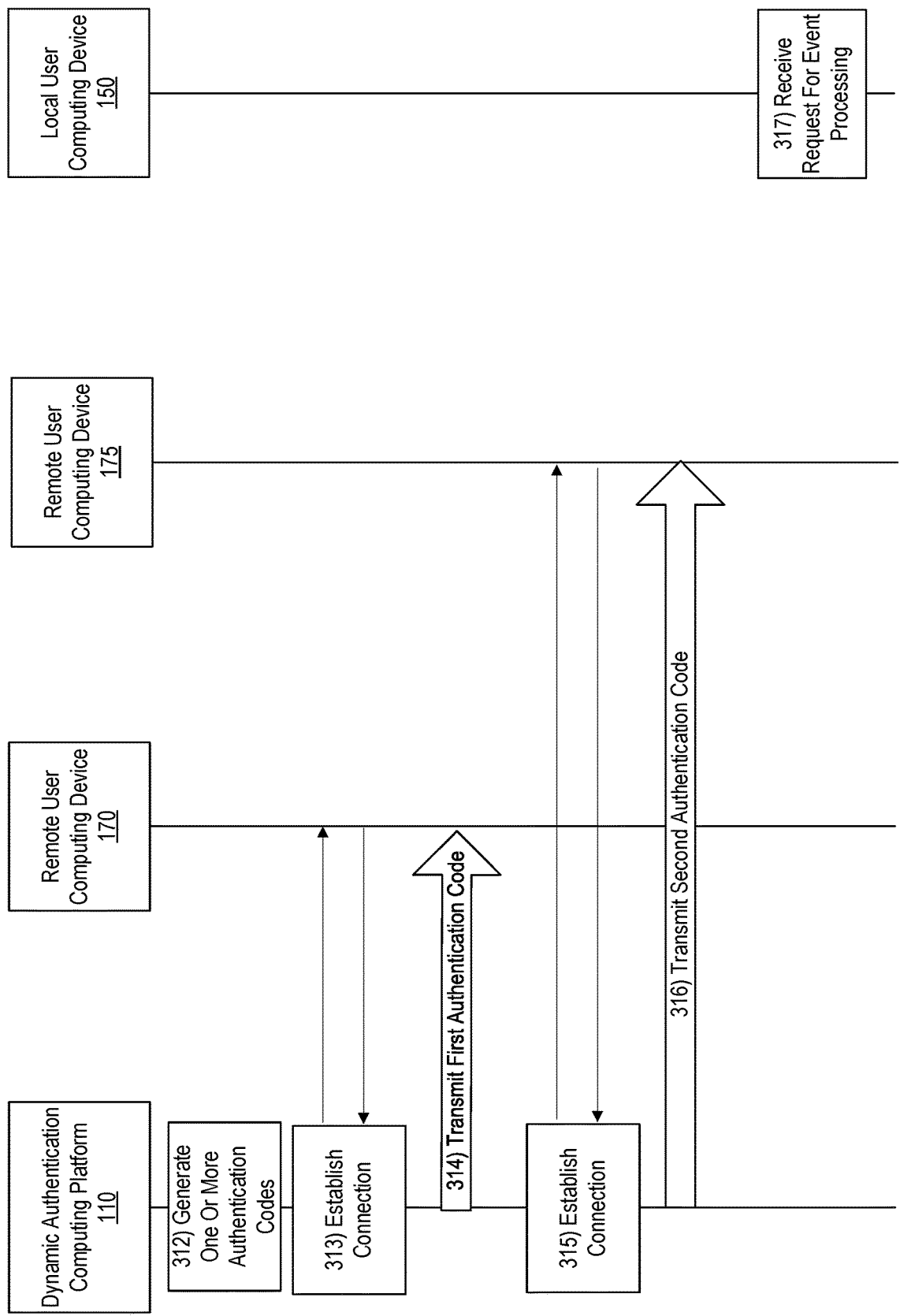

With reference to FIG. 3B, at step 307, the first request for authentication information may be transmitted to the remote user computing device 170. In some examples, the first request for authentication information may be transmitted during the communication initiated when the first wireless communication session was established.

At step 308, the request for first authentication information may be received and displayed by the remote user computing device 170. At step 309, first authentication response data may be received by the remote user computing device 170. For instance, in response to the displayed request for first authentication information, the user may input response data (e.g., username, password, PIN, or the like) to the remote user computing device 170.

At step 310, the first authentication response data may be transmitted from the remote user computing device 170 to the dynamic authentication computing platform 110. At step 311, the first authentication response data may be received by the dynamic authentication computing platform 110 and may be analyzed to determine whether the response data matches pre-stored authentication data (e.g., whether a username, PIN, password, or the like matches pre-stored data).

If the received first authentication response data does not match pre-stored data, the user might not be authenticated and, instead, a notification may be transmitted to the remote user computing device 170 denying the request for registration.

If the received first authentication response data does match pre-stored data, the dynamic authentication computing platform 110 may initiate a process to generate a dynamic request for additional authentication data. For instance, with reference to FIG. 3C, at step 312, one or more authentication codes may be dynamically generated. For instance, one or more unique, alphanumeric codes that may be used to authenticate a user when processing an event may be generated by the dynamic authentication computing platform 110.

At step 313, a connection may be established between the remote user computing device 170 and the dynamic authentication computing platform 110. For instance, a second wireless connection may be established between the remote user computing device 170 and the dynamic authentication computing platform 110. Upon establishing the second wireless connection, a communication session may be initiated between the dynamic authentication computing platform 110 and the remote user computing device 170.

At step 314, a first code of the one or more dynamically generated codes may be transmitted to from the dynamic authentication computing platform 110 to the remote user computing device 170. For instance, the first code may be transmitted during the communication session initiated when the second wireless connection was established.

At step 315, a connection may be established between the remote user computing device 175 and the dynamic authentication computing platform 110. For instance, a third wireless connection may be established between the remote user computing device 175 and the dynamic authentication computing platform 110. Upon establishing the third wireless connection, a communication session may be initiated between the dynamic authentication computing platform 110 and the remote user computing device 175.

At step 316, a second code of the one or more dynamically generated codes may be transmitted to from the dynamic authentication computing platform 110 to the remote user computing device 175. For instance, the second code may be transmitted during the communication session initiated when the third wireless connection was established.

At step 317, a request to process an event may be received. For instance, the request may include a request to access functionality (e.g., at an ATM), a request to process a transaction (e.g., at a point-of-sale system), or the like. Although the request is shown as being received by the local user computing device 150, in some examples, the request may be received via remote user computing device 170 or remote user computing device 175 (e.g., when a transaction is being processed via a payment application executing on a mobile device of the user, when a user is attempting to access functionality provided by an application executing on the mobile device or an online application, or the like).

Figure 3D:
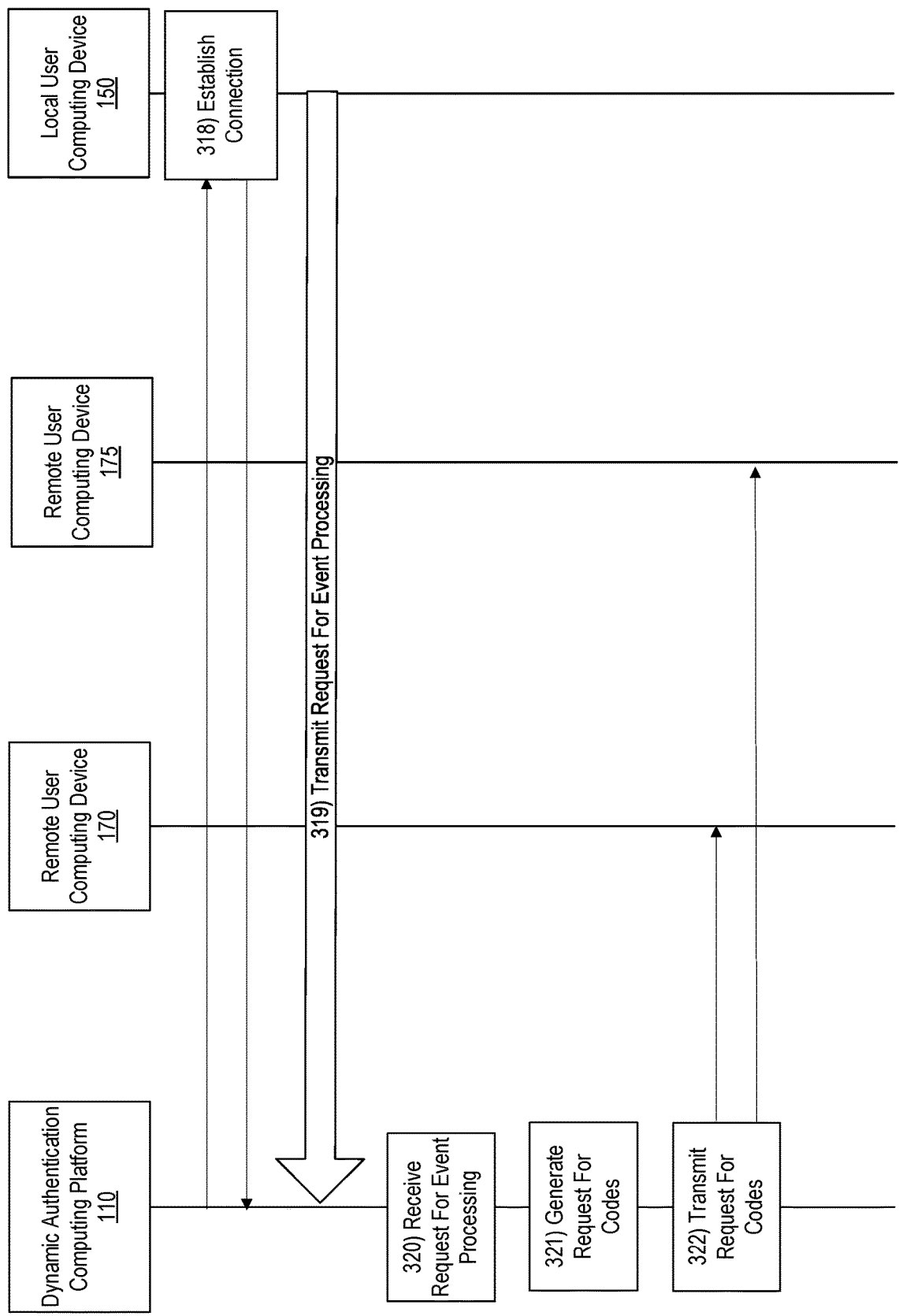

With reference to FIG. 3D, at step 318, a connection may be established between the local user computing device 150 and the dynamic authentication computing platform 110. For instance, a fourth wireless connection may be established between the local user computing device 150 and the dynamic authentication computing platform 110. Upon establishing the fourth wireless connection, a communication session may be initiated between the dynamic authentication computing platform 110 and the local user computing device 150.

At step 319, the received request for event processing may be transmitted from the local user computing device 150 to the dynamic authentication computing platform 110. In some examples, the request for event processing may include additional data, such as a user requesting the event processing, a type of event, an amount (if any) associated with the event, and the like.

At step 320, the request for event processing may be received by the dynamic authentication computing platform 110 and, at step, 321, a request for pre-generated authentication codes may be generated. For instance, by registering with the dynamic authentication computing platform 110, the dynamic authentication computing platform 110 may recognize the requested event as a type of event or other criteria for requiring dynamic authentication. Accordingly, the dynamic authentication computing platform 110 may generate a request for the one or more generated codes.

At step 322, the generated request for the one or more authentication codes may be transmitted to remote user computing device 170 and remote user computing device 175. In some examples, remote user computing device 170 may be associated with a supervisory user who may be required to input a code in order to not only authenticate a user (e.g., a user requesting event processing and associated with remote user computing device 175) but to authorize processing of the event. In some examples, the request for the first authentication may include details associated with the requested event (e.g., amount, type of event, or the like).

Figure 3E:
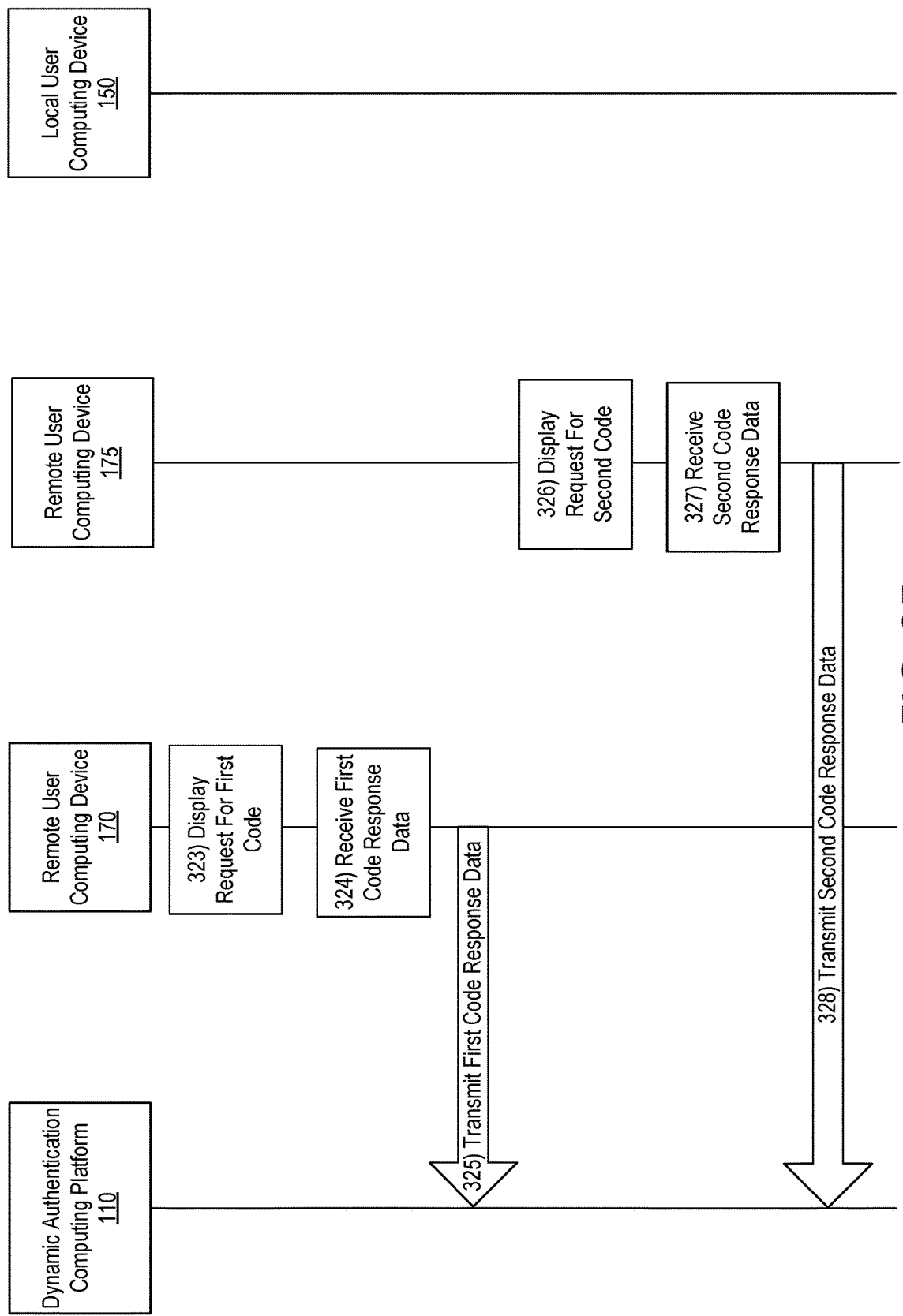

With reference to FIG. 3E, at step 323, the request for the first authentication code may be received by the remote user computing device 170 and may be displayed on a display of the remote user computing device 170. At step 324, first code response data may be received by the remote user computing device 170. For instance, a user associated with remote user computing device 170 may input the first authentication code to the remote user computing device 170.

At step 325, the first code response data may be transmitted from the remote user computing device 170 to the dynamic authentication computing platform.

At step 326, the request for the second authentication code may be received by the remote user computing device 175 and may be displayed on a display of the remote user computing device 175. At step 327, second code response data may be received by the remote user computing device 175. For instance, a user associated with remote user computing device 175 may input the second authentication code to the remote user computing device 175.

At step 328, the second code response data may be transmitted from the remote user computing device 175 to the dynamic authentication computing platform.

Figure 3F:
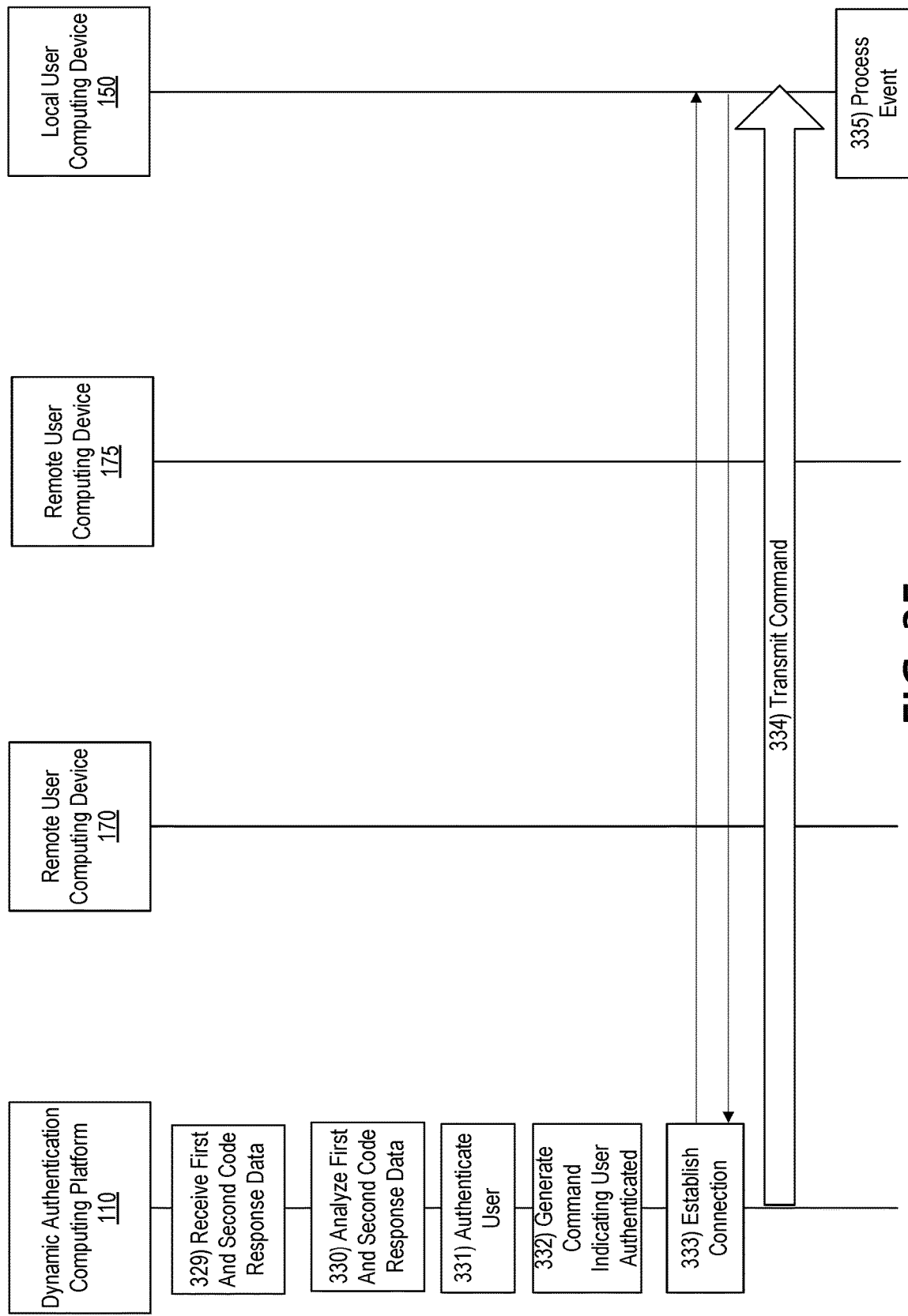

With reference to FIG. 3F, at step 329, the first and second code response data may be received by the dynamic authentication computing platform 110. At step 330, the dynamic authentication computing platform 110 may analyze the received first and second code response data to determine whether a match exists between the generated authentication codes and the first and second code response data. If so, the user may be authenticated at step 331.

At step 332, an instruction or command may be generated to cause the event to be processed. The instruction or command may include an indication that the user has been authenticated.

At step 333, a connection may be established between the dynamic authentication computing platform 110 and the local user computing device 150. For instance, a fifth wireless connection may be established between the local user computing device 150 and the dynamic authentication computing platform 110. Upon establishing the fifth wireless connection, a communication session may be initiated between the dynamic authentication computing platform 110 and the local user computing device 150. In some examples, the fourth wireless connection may still be established and the communication session maintained. In those examples, step 333 may be omitted.

At step 334, the command or instruction may be transmitted to the local user computing device 150 and at step 335, the event may be processed.

FIGS. 4A-4E depict yet another illustrative event sequence for implementing and using dynamic authentication functions in accordance with one or more aspects described herein. The events shown in the illustrative event sequence are merely one example sequence and additional events may be added, or events may be omitted, without departing from the invention.

Figure 4A:
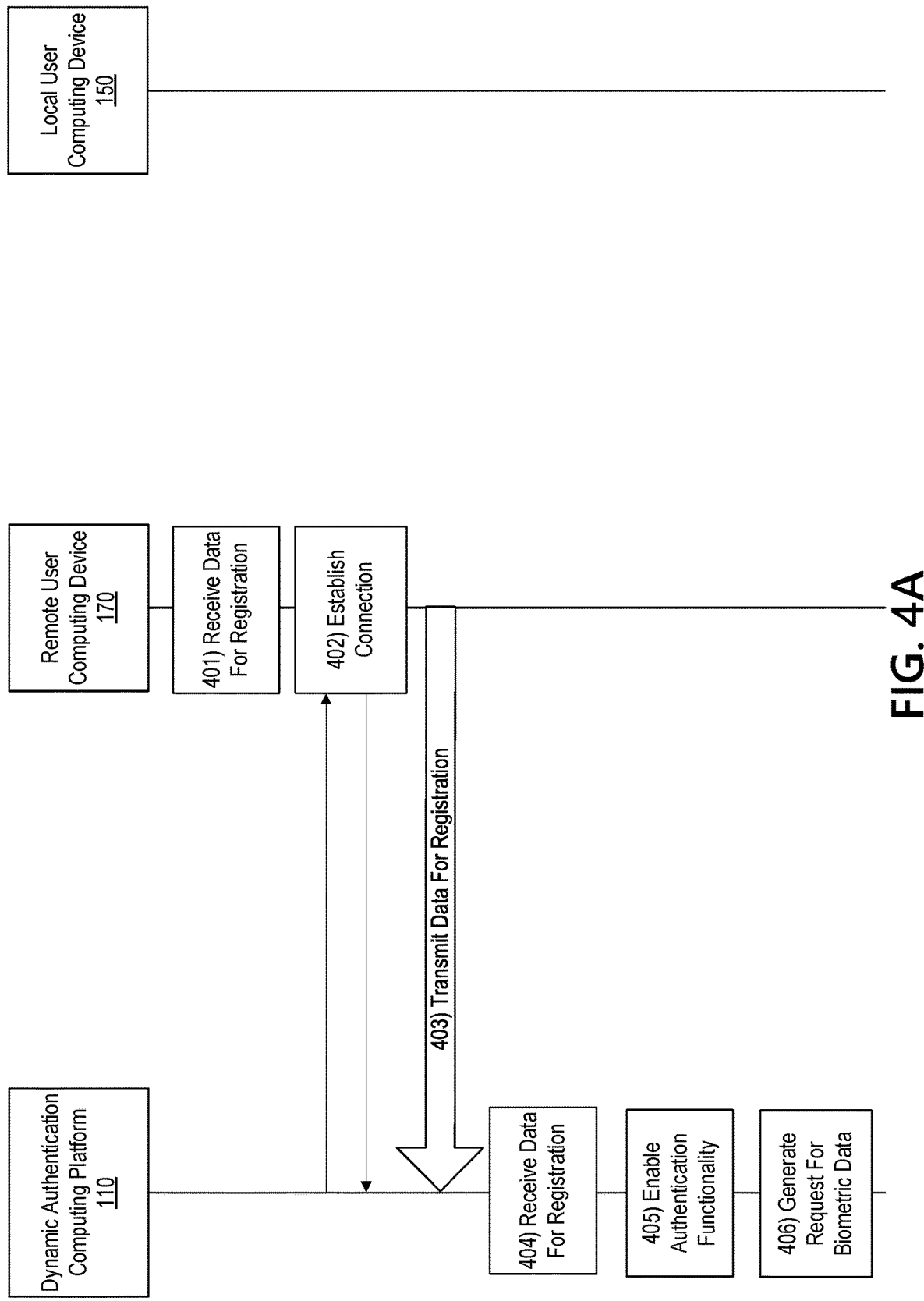
FIGS. 4A-4E depict yet another illustrative event sequence for implementing dynamic authentication functions in accordance with one or more aspects described herein.

Referring to FIG. 4A, at step 401, data for registration may be received by, for example, remote user computing device 170. For instance, a user may open or otherwise cause an application to execute on the remote user computing device 170 that enables a user to register with, for instance, the dynamic authentication computing platform 110. In some examples, the registration information may include a name of the user or other identifier associated with the user, contact information, any parameters for use (e.g., types of events to be processed with additional authentication aspects, or the like), or the like.

At step 402, a connection may be established between the remote user computing device 170 and the dynamic authentication computing platform 110. For instance, a first wireless connection may be established between the remote user computing device 170 and the dynamic authentication computing platform 110. Upon establishing the first wireless connection, a communication session may be initiated between the dynamic authentication computing platform 110 and the remote user computing device 170.

At step 403, the received registration data may be transmitted to the dynamic authentication computing platform 110. In some examples, the registration data may include a request for registration. At step 404, the dynamic authentication computing platform 110 may receive the registration data and request.

At step 405, authentication functionality may be enabled. For instance, one or more functions associated with authentication may be enabled, activated or initiated by the dynamic authentication computing platform 110 (e.g., functions that were previously disabled or not available).

At step 406, a request for biometric data may be generated. For instance, the user may be requesting to register to use temporary biometric data functions to authenticate a user. Accordingly, dynamic authentication computing platform 110 may generate a request for biometric data of the user, such as fingerprint, voice print, iris scan, or the like.

Figure 4B:
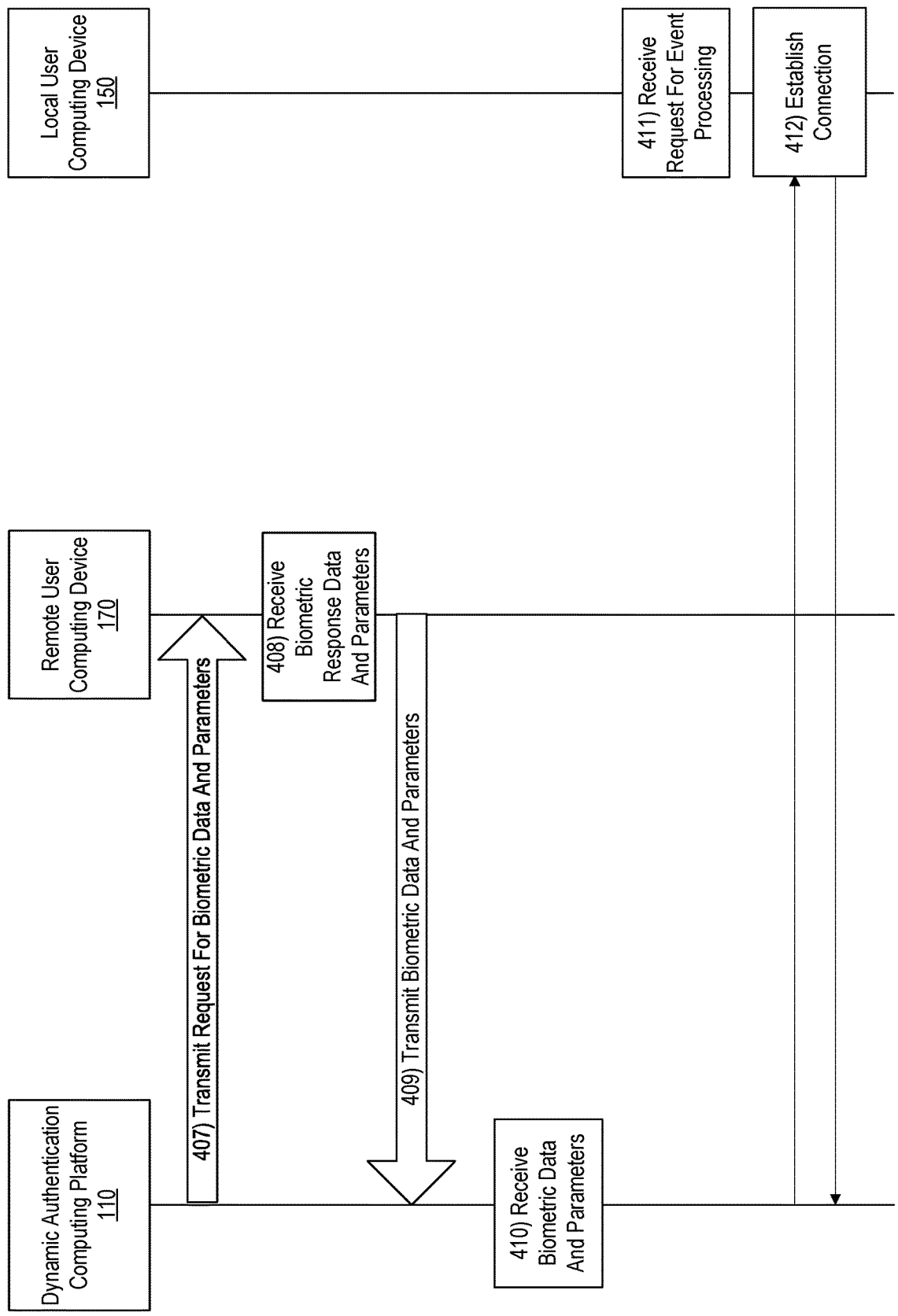

With reference to FIG. 4B, at step 407, the request for biometric data may be transmitted to the remote user computing device 170. At step 408, biometric response data may be received by the remote user computing device 170. For instance, the user may provide, via one or more sensors, microphones, applications executing on the remote user computing device, or the like, biometric data, such as a fingerprint, voiceprint, iris scan, or the like. In some examples, one or more parameters in which the biometric data may be used to authenticate a user may be received. For instance, in examples in which the biometric data is available for use in authenticating a user for a temporary period of time, the user may also provide the time period (e.g., one day, two hours, one week, or the like) for which the biometric data may be active and used to authenticate the user.

At step 409, the biometric response data and parameters may be transmitted from the remote user computing device 170 to the dynamic authentication computing platform 110. At step 410, the biometric response data and parameters may be received by the dynamic authentication computing platform 110 and stored.

At step 411, a request to process an event may be received. For instance, the request may include a request to access functionality (e.g., at an ATM), a request to process a transaction (e.g., at a point-of-sale system), or the like. Although the request is shown as being received by the local user computing device 150, in some examples, the request may be received via remote user computing device 170 (e.g., when a transaction is being processed via a payment application executing on a mobile device of the user, when a user is attempting to access functionality provided by an application executing on the mobile device or an online application, or the like).

At step 412, a connection may be established between the local user computing device 150 and the dynamic authentication computing platform 110. For instance, a second wireless connection may be established between the local user computing device 150 and the dynamic authentication computing platform 110. Upon establishing the second wireless connection, a communication session may be initiated between the dynamic authentication computing platform 110 and the local user computing device 150.

Figure 4C:
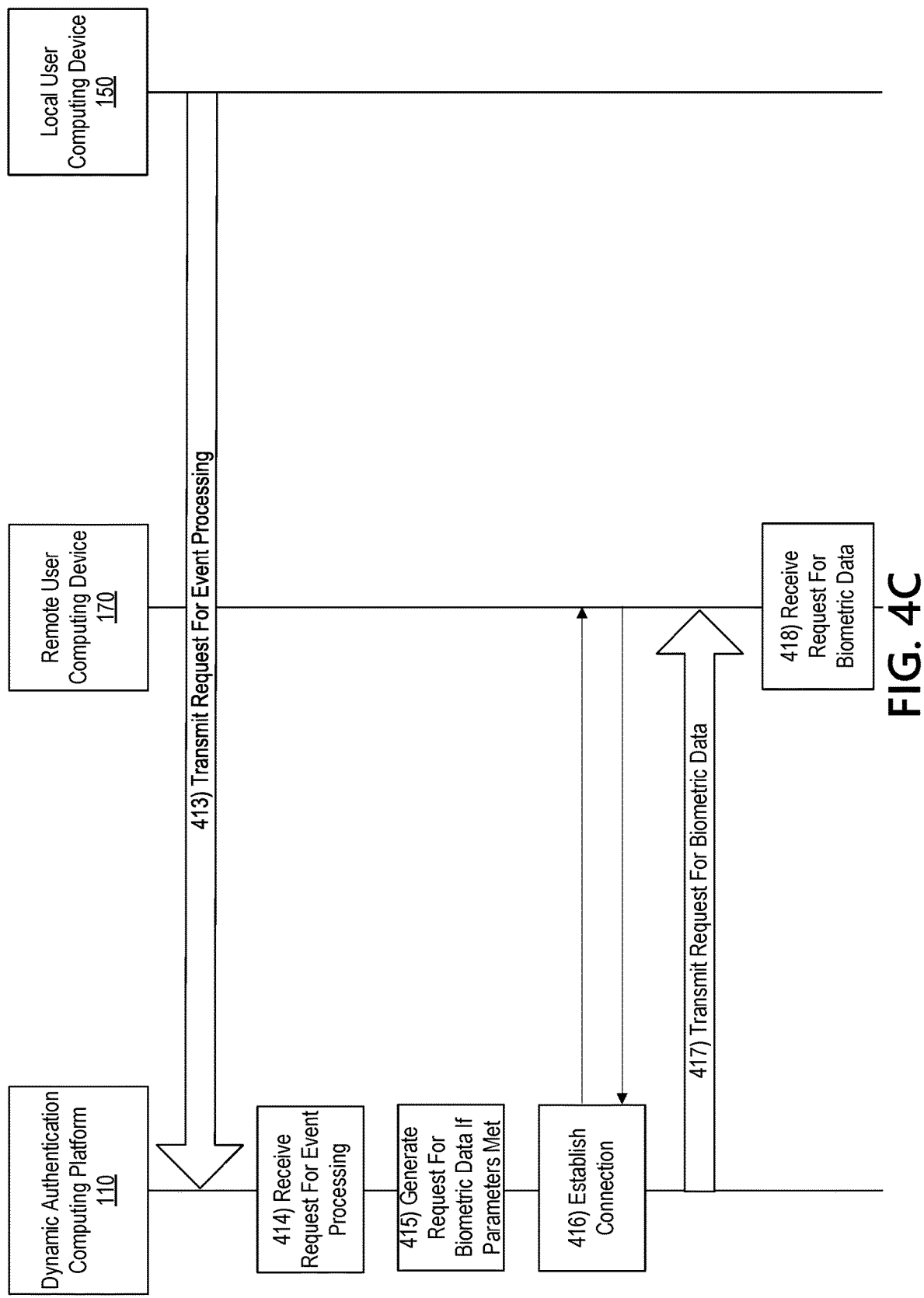

With reference to FIG. 4C, at step 413, the received request for event processing may be transmitted from the local user computing device 150 to the dynamic authentication computing platform 110. In some examples, the request for event processing may include additional data, such as a user requesting the event processing, a type of event, an amount (if any) associated with the event, and the like.

At step 414, the request for event processing may be received by the dynamic authentication computing platform 110 and, at step, 415, a request for biometric data may be generated if parameters are met. For instance, if the request for event processing is received within the time period in which the biometric data is active and available for use in authenticating a user, a request for biometric data may be generated.

At step 416, a connection may be established between the remote user computing device 170 and the dynamic authentication computing platform 110. For instance, a third wireless connection may be established between the remote user computing device 170 and the dynamic authentication computing platform 110. Upon establishing the third wireless connection, a communication session may be initiated between the dynamic authentication computing platform 110 and the remote user computing device 170.

At step 417, the request for biometric data may be transmitted from the dynamic authentication computing platform 110 to the remote user computing device 170. In some examples, the request for biometric data may include details of the event processing request (e.g., amount, type, or the like). At step 418, the request for biometric data may be received by the remote user computing device 170.

Figure 4D:
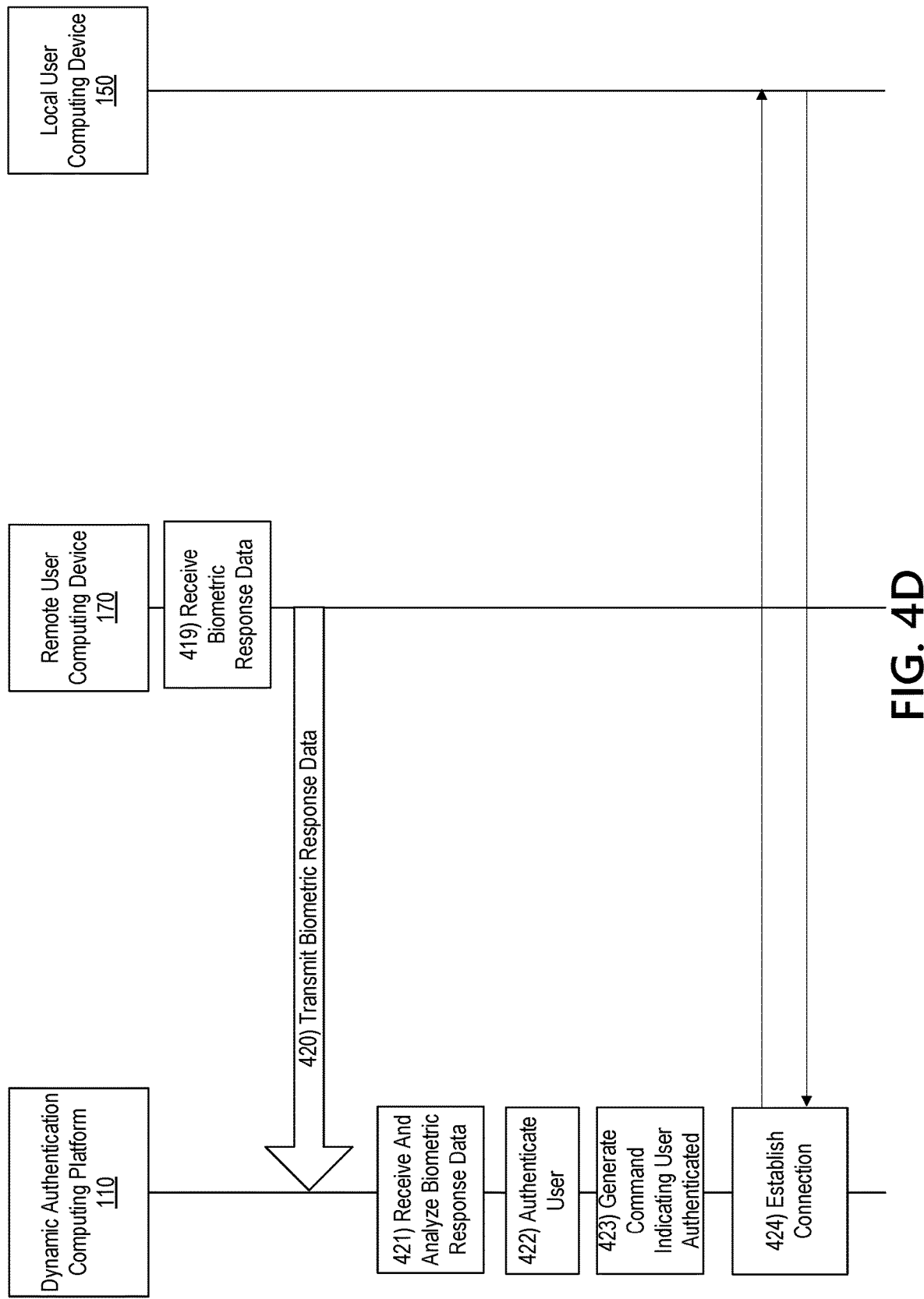

With reference to FIG. 4D, at step 419, biometric response data may be received. For instance, in response to the request for biometric data, the user may submit (e.g., via one or more sensors, microphones, applications, or the like) biometric data in real-time via the remote user computing device 170. At step 420, the received biometric response data may be transmitted from the remote user computing device 170 to the dynamic authentication computing platform 110.

At step 421, the biometric response data may be received by the dynamic authentication computing platform 110 and analyzed to determine whether the received biometric response data matches biometric response data stored by the dynamic authentication computing platform. If so, the user may be authenticated at step 422.

At step 423, an instruction or command may be generated to cause the event to be processed. The instruction or command may include an indication that the user has been authenticated.

At step 424, a connection may be established between the dynamic authentication computing platform 110 and the local user computing device 150. For instance, a fourth wireless connection may be established between the local user computing device 150 and the dynamic authentication computing platform 110. Upon establishing the fourth wireless connection, a communication session may be initiated between the dynamic authentication computing platform 110 and the local user computing device 150. In some examples, the second wireless connection may still be established and the communication session maintained. In those examples, step 424 may be omitted.

Figure 4E:
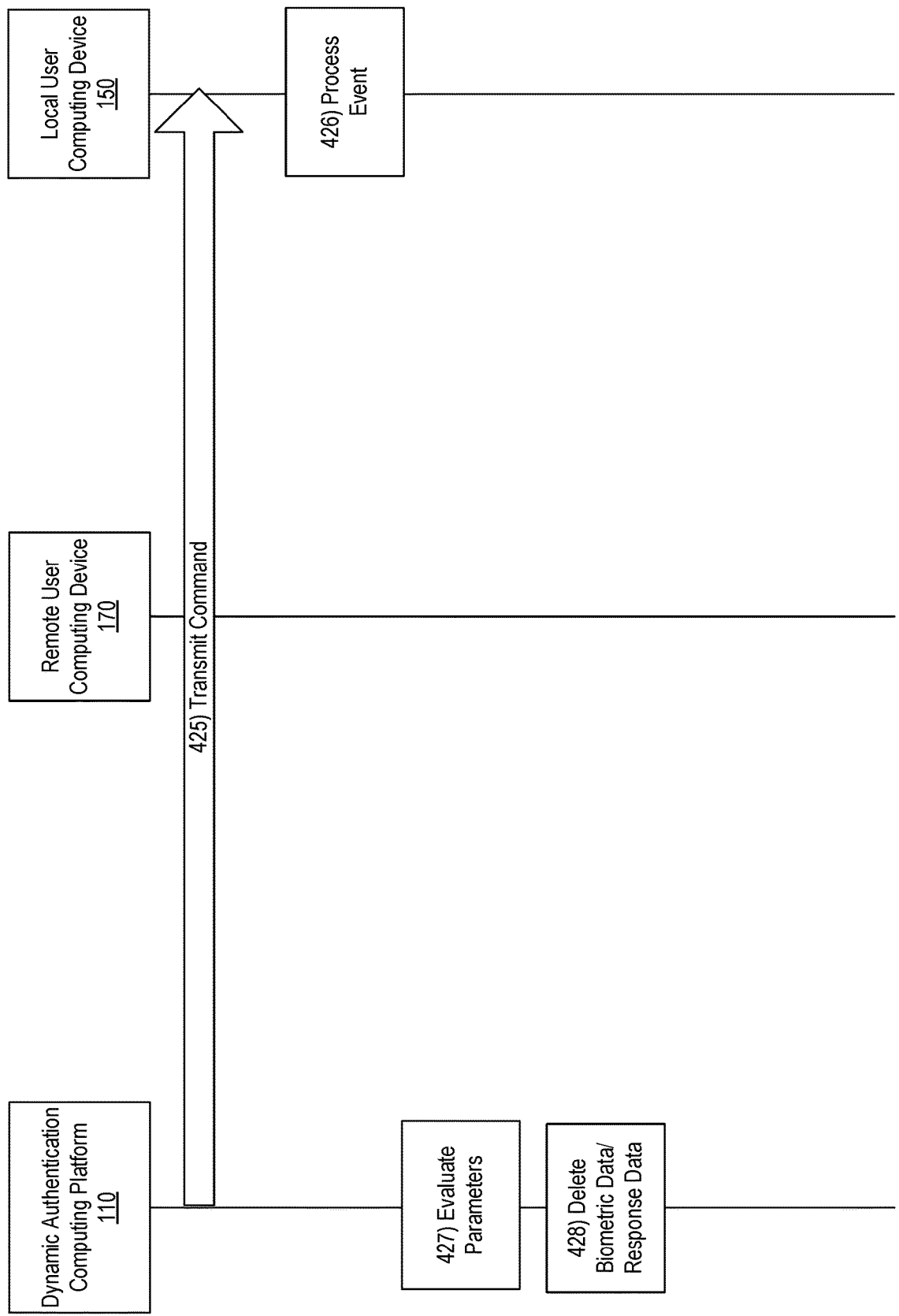

With reference to FIG. 4E, at step 425, the command or instruction may be transmitted to the local user computing device 150 and at step 426, the event may be processed.

At step 427, the parameters received by the dynamic authentication computing platform 110 may be evaluated. For instance, the parameters received may be continuously evaluated or evaluated on a periodic or aperiodic basis to determine whether a time period for which biometric data is active and available for use in authenticating a user has expired. Response to determining that a time period has expired, the biometric data and/or biometric response data may be deleted in step 428. Accordingly, if the user desires to use biometric data for authentication after expiration of the time period, he or she may have to re-register or again provide biometric data for use in comparison because earlier provided biometric data will have been deleted upon expiration of the designated time period.

Figure 5:
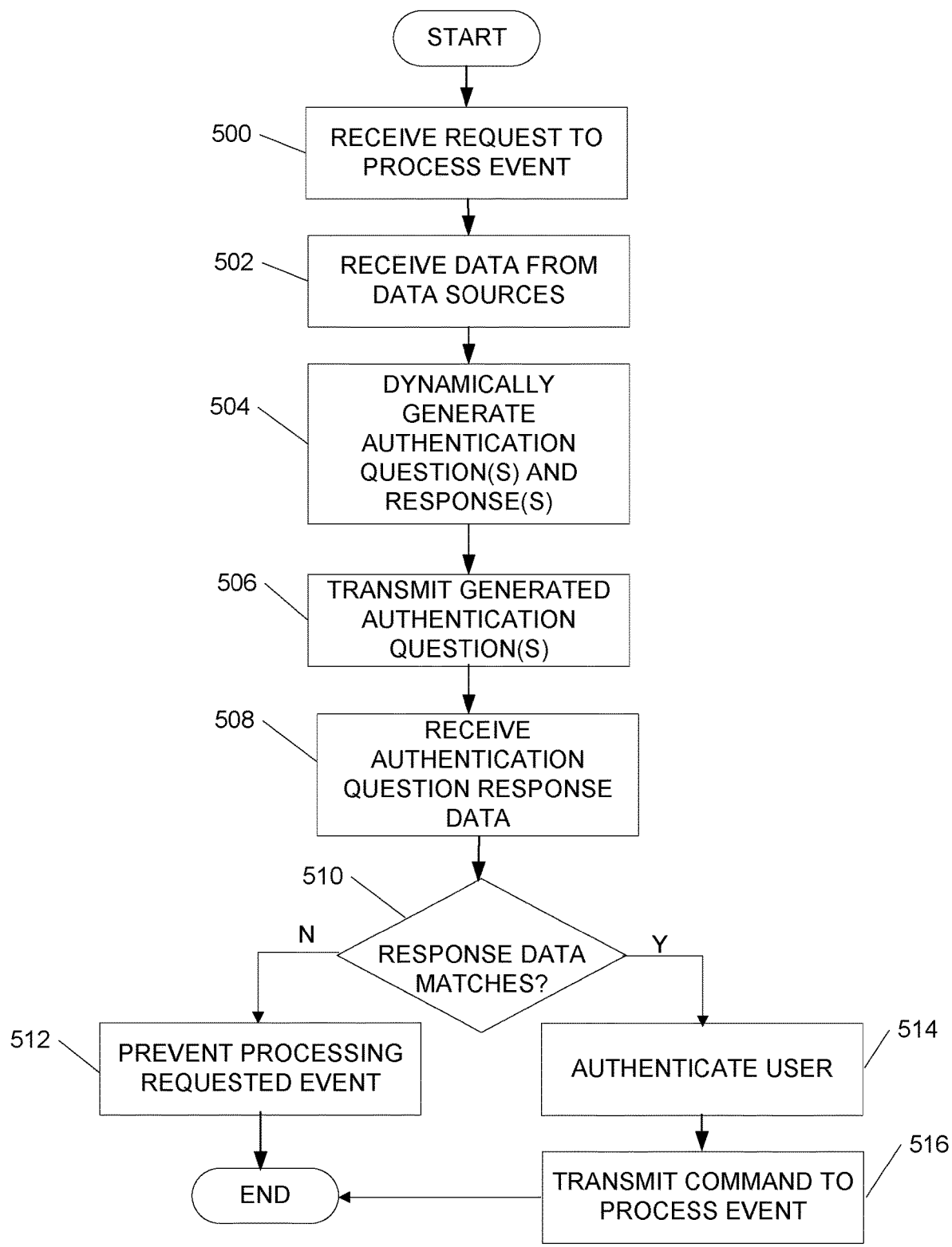
FIG. 5 depicts an illustrative method for implementing and using a system to perform dynamic authentication functions, according to one or more aspects described herein.

FIG. 5 is a flow chart illustrating one example method of providing dynamic authentication functions according to one or more aspects described herein. The processes illustrated in FIG. 5 are merely some example processes and functions. The steps shown may be performed in a different order, more steps may be added, or one or more steps may be omitted without departing from the invention.

At step 500, a request to process an event may be received by, for instance, the dynamic authentication computing platform 110. In some examples, the request may be received from a remote user computing device, such as a mobile device of a user, point-of-sale system of a vendor, or the like. In other examples, the request may be received from a local user computing device, such as an ATM or other self-service kiosk.

At step 502, data may be received from one or more sources. For instance, data related to a user requesting event processing may be extracted from one or more internal and/or external sources. The data may include account data, transaction history, location data, demographic data, and the like.

At step 504, the received data may be analyzing using machine learning to dynamically generate one or more authentication questions and one or more corresponding responses or answer to the one or more authentication questions. In some examples, the data may be received, analyzed and the authentication questions dynamically generated in real-time response to receiving the request to process the event.

At step 506, the generated one or more authentication questions may be transmitted to a computing device. In some examples, the authentication questions may be transmitted to the device from which the request to process the event was received. In other examples, the authentication questions may be transmitted to a different computing device (e.g., transmitted to a mobile device of a user when the event is requested via an ATM, in one example).

At step 508, authentication question response data may be received and analyzed. At step 510, a determination may be made as to whether the received authentication question response data matches (e.g., within a threshold) the corresponding generated responses. If not, the request for event processing may be denied and/or processing the event may be prevented in step 512.

If the received authentication question response data matches the corresponding generated response, the user may be authenticated at step 514. At step 516, a command or instruction to process the event may be transmitted from the dynamic authentication computing platform 110 to the device from which the request to process the event was received.

As discussed herein, the aspects described are directed to systems, devices and arrangements for providing improved security when processing events. For instance, the dynamic authentication functions described herein provide additional security to user's information and privacy that is not available with static authentication functions. The use of machine learning enables use of a vast amounts of data to provide an ever-changing array of authentication functions and options that are dynamically generated and temporarily available in order to ensure user privacy.

For instance, data related to user's transaction history, current location, and the like, may be used to generate one or more authentication questions. For example, if a user is attempting to access an ATM, the system may receive current location data from the user and may dynamically generate an authentication question that includes, for example, "please provide the address of the building across the street from the ATM." In this example, the GPS data may be obtained from the mobile device of the user based on the user providing contact information to the system (e.g., the user is associated with the mobile device). The GPS data may be analyzed by the machine learning engine in conjunction with publicly available data about buildings and addresses in the surrounding area to generate the authentication question.

The system may also generate one or more acceptable responses or answers. For instance, there may be three buildings that could be considered "across the street" from the ATM. The system may then generate corresponding responses or answers that include each of those addresses so that the user can provide an address from any of the buildings "across the street" in order to authenticate. Accordingly, if an unauthorized user is attempting to access the ATM, that user would not have the mobile device of the authorized user. The authorized user would receive the authentication question and would be able to identify attempted unauthorized access. Alternatively, if the authorized user is the person attempting to access the ATM, he or she will receive the authentication question via the mobile device, look around to obtain a response and provide the response data to authenticate. Accordingly, geographic data, as well as time data (e.g., current location of user), can be used in the dynamic authentication process.

As discussed above, in examples in which one or more authentication questions are dynamically generated, in some examples, a plurality of authentication questions may be dynamically generated. The corresponding responses or answers may be generated and, in some arrangements, response data received to each authentication question must be provided in a particular sequence in order to authenticate the user. This may add an additional layer of security to the process.

In some examples, the authentication questions may be tied to an activity of a user. For instance, if a user is attempting to make a purchase at a sporting event, the system may determine the location, access current data related to the sporting event, and prompt the user with a question or "who is winning?"

In some examples, the system may automatically initiate and/or execute functions to provide dynamic authentication based on activity of the user. For instance, the system may monitor social media activity, transaction activity, and the like, to detect a potential issue or merely provide additional security for the user by initiating dynamic authentication functions. For instance, if the system detects that a user is doing "back to school" shopping (e.g., based on social media, or the like), the system may automatically initiate dynamic authentication functions in anticipation of several events being processed, such as purchases being made.

As discussed herein, one or more aspects of dynamic authentication may include generation and use of unique authentication codes. As discussed herein, the unique authentication codes may be used as a single factor of authentication or in multi-factor authentication. Although authentication codes may be used when a single user is processing an event, as discussed above, authentication codes are also advantageous in arrangements in which multiple users are involved in an event processing. For instance, a parent may give a child a payment device for use in purchases school supplies. The use of multiple authentication codes dynamically generated and/or transmitted to devices associated with both the parent and the child provides additional security and provides the parent the ability to review purchases and authorize or decline by either authenticating via the authentication code or not authenticating (e.g., not providing the code, providing an incorrect code, or the like).

In some examples, a combination of codes, authentication questions, and/or biometric data may be used to authenticate. For instance, a child may receive an authentication code for use with a payment device. Upon attempting to process an event with the payment device, the system may prompt the child to input his or her authentication code and may dynamically generate an authentication question that is then transmitted to a computing device of a parent or guardian for further authentication. In some examples, criteria may be pre-set for when parent authentication is also required. For instance, purchases below a predetermine amount, certain types of purchases, or the like, might not require input from the parent. If an event does not meet the pre-set criteria, the system may initiate dynamic authentication and may generate and transmit the authentication question.

Although aspects described herein are related to use of dynamic authentication in relationships having a supervisory user, aspects can also be used with respect to other types of relationships. For instance, a business may require approval of more than one employee when making certain types of decisions, purchases, and the like. The dynamic authentication functions described herein may be used to authenticate users and provide additional security.

Although aspects described herein with respect to using biometric data that is temporarily stored are described in the context of a user using his or her own biometric data, in some examples, those arrangements may be used to enable authentication using another person's biometric data. For instance, a parent may register with the system to authorize a child to make purchases using a payment device. The parent may submit the biometric data, such as a fingerprint, voice print, facial scan, iris scan, or the like, of the child, who will be using the payment device and may authorize use of the child's biometric data for a period of four hours. During that time period, the child may submit, via his or her own computing device, his or her own biometric data in response to an authentication request and may be authenticated. After the expiration of the four-hour time period, the child's biometric data may be deleted and will no longer be available for use in authentication.

In such arrangements in which one user is providing temporary access to another user, the primary user may, at any time, revoke access by deleting the stored biometric data before the expiration of the time period. Additionally or alternatively, the primary user could modify criteria to require authentication of the primary user as well as the child in order to process any events.

As discussed herein, one or more aspects may be performed in real-time or near real-time in order to provide prompt, secure authentication functions. In addition, dynamically generating authentication data provides ever-changing, personalized authentication functions that enhance security. In addition, as more data is gathered or accessed for a particular user, questions may become more personalized, thereby further enhancing security.

Although aspects herein are described with respect to processing events such as purchases, ATM functions, and the like, the dynamic authentication functions described herein may be used anywhere that users are authenticated. For instance, in attempting to access or log in to a Wi-Fi network, accessing data via an on-line application, entering a building having controlled access, or the like.

Aspects herein are directed to access data associated with various users. The data may be accessed with the permission of the user and upon a user enrolling in or registering with the dynamic authentication system.

The above-described examples are merely some example arrangements in which the systems described herein may be used. Various other arrangements employing aspects described herein may be used without departing from the invention.

Figure 6:
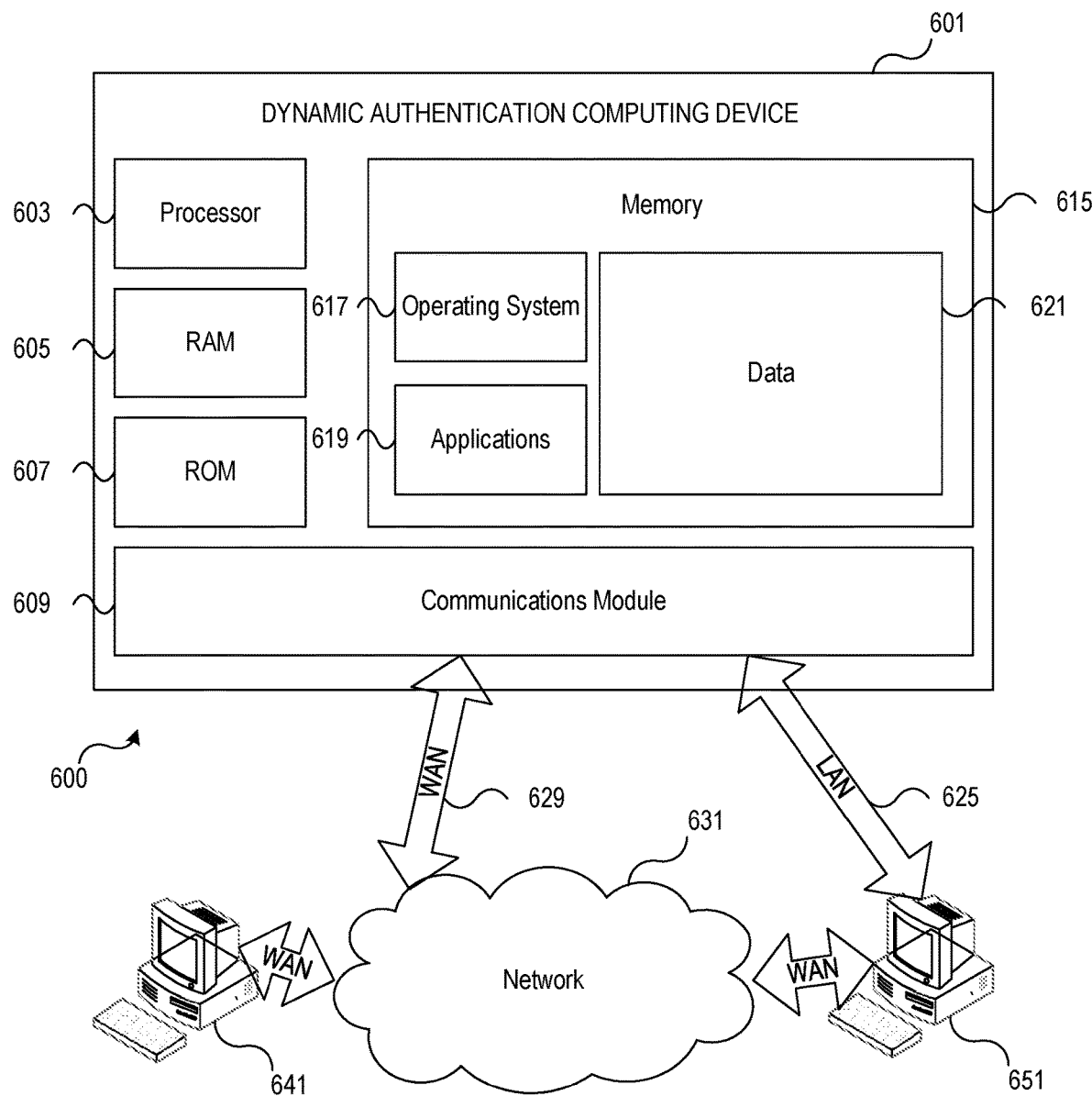
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic authentication computing device 601 having processor 603 for controlling overall operation of dynamic authentication computing device 601 and its associated components, including Random Access Memory (RAM) 605, Read-Only Memory (ROM) 607, communications module 609, and memory 615. Dynamic authentication computing device 601 may include a variety of computer readable media. Computer readable media may be any available media that may be accessed by dynamic authentication computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic authentication computing device 601. Such a processor may execute computer-executable instructions stored on a computer-readable medium.

Software may be stored within memory 615 and/or storage to provide instructions to processor 603 for enabling dynamic authentication computing device 601 to perform various functions as discussed herein. For example, memory 615 may store software used by dynamic authentication computing device 601, such as operating system 617, application programs 619, and associated database 621. Also, some or all of the computer executable instructions for dynamic authentication computing device 601 may be embodied in hardware or firmware. Although not shown, RAM 605 may include one or more applications representing the application data stored in RAM 605 while dynamic authentication computing device 601 is on and corresponding software applications (e.g., software tasks) are running on dynamic authentication computing device 601.

Communications module 609 may include a microphone, keypad, touch screen, and/or stylus through which a user of dynamic authentication computing device 601 may provide input, and may also include one or more of a speaker for providing audio output and a video display device for providing textual, audiovisual and/or graphical output. Computing system environment 600 may also include optical scanners (not shown).

Dynamic authentication computing device 601 may operate in a networked environment supporting connections to one or more remote computing devices, such as computing devices 641 and 651. Computing devices 641 and 651 may be personal computing devices or servers that include any or all of the elements described above relative to dynamic authentication computing device 601.

The network connections depicted in FIG. 6 may include Local Area Network (LAN) 625 and Wide Area Network (WAN) 629, as well as other networks. When used in a LAN networking environment, dynamic authentication computing device 601 may be connected to LAN 625 through a network interface or adapter in communications module 609. When used in a WAN networking environment, dynamic authentication computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
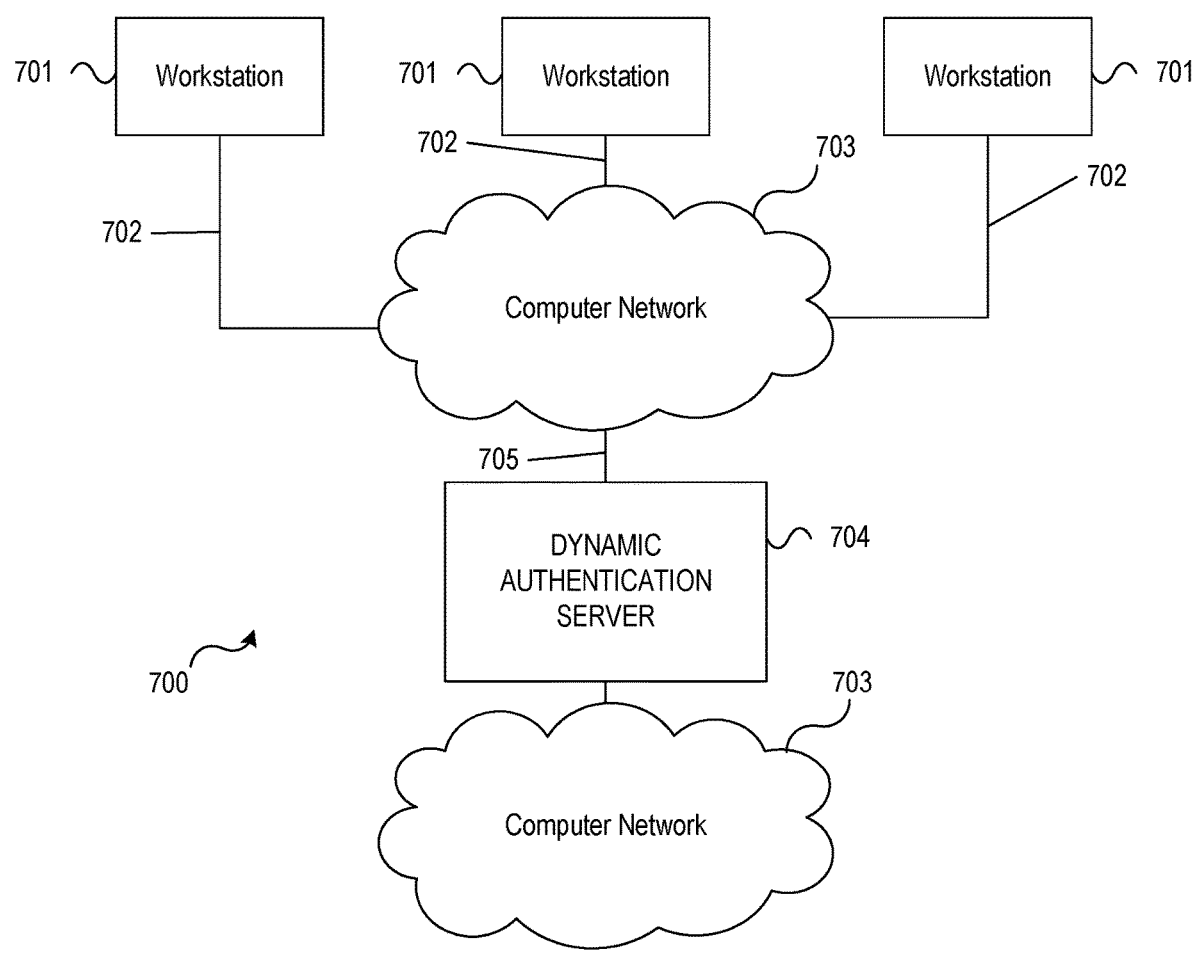
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic authentication server 704. In system 700, dynamic authentication server 704 may be a server, processor, computer, or data processing device, or combination of the same, configured to perform the functions and/or processes described herein. Server 704 may be used to receive requests to process events, retrieve data from one or more sources, dynamically generate authentication questions and corresponding responses or answers, evaluate authentication response data, biometric response data, and the like, authenticate a user, cause processing of an event, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic authentication server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive a request to process an event;
   responsive to receiving the request to process the event, receive data from a plurality of sources;
   dynamically generate, based on the received data from the plurality of sources and using one or more machine learning datasets, a first authentication question and first corresponding answer and a second authentication question and second corresponding answer for use in authenticating a user requesting processing of the event prior to the request to process the event, the first authentication question and the second authentication question being generated in real-time;
   transmit the first authentication question and the second authentication question to a computing device;
   receive, from the computing device, authentication question response data;
   compare the authentication question response data to the generated first corresponding answer and second corresponding answer to determine whether a match exists between the received authentication question response data and the generated first corresponding answer and second corresponding answer, wherein determining whether a match exists includes determining whether the first corresponding answer and second corresponding answer were received in a particular sequence order;
   responsive to determining that a match exists between the authentication question response data and the generated first corresponding answer and second corresponding answer:
   authenticate the user requesting to process the event;
   generate an instruction to process the event; and
   transmit the instruction causing the event to be processed.

2. The computing platform of claim 1, wherein the data is received from at least one internal source internal to an entity implementing the computing platform and one external source external to the entity implementing the computing platform.

3. The computing platform of claim 2, wherein the data includes at least one of: current location information for the user based on global positioning system (GPS) data of a computing device associated with the user, event processing history of the user, and demographic data.

4. The computing platform of claim 1, further including instructions that, when executed, cause the computing platform to:
prior to dynamically generating the first authentication question and the second authentication question:
generate a request for authentication information;
transmit the request for authentication information;
receive authentication information response data;
compare the received authentication information response data to pre-stored authentication information to determine whether the received authentication information response data matches the pre-stored authentication information; and
responsive to determining that the received authentication information response data does match the pre-stored authentication information, dynamically generating the first authentication question and the second authentication question.

5. The computing platform of claim 1, wherein the dynamically generated first authentication question and first corresponding answer are generated by the computing platform without input from the user.

6. A method, comprising:
at a computing platform comprising at least one processor, memory, and a communication interface:
receiving, by the at least one processor and via the communication interface, a request to process an event;
responsive to receiving the request to process the event, receiving, by the at least one processor and via the communication interface, data from a plurality of sources;
dynamically generating, by the at least one processor and based on the received data from the plurality of sources and using one or more machine learning datasets, a first authentication question and first corresponding answer and a second authentication question and second corresponding answer for use in authenticating a user requesting the processing of the event prior to the request to process the event, the first authentication question and second authentication question being generated in real-time;
transmitting, by the at least one processor and via the communication interface, the first authentication question and the second authentication question to a computing device;
receiving, by the at least one processor from the computing device via the communication interface, authentication question response data;
comparing, by the at least one processor, the authentication question response data to the generated first corresponding answer and second corresponding answer to determine whether a match exists between the received authentication question response data and the generated first corresponding answer and second corresponding answer, wherein whether a match exists includes determining whether the first corresponding answer and second corresponding answer were received in a particular sequence order;
responsive to determining that a match exists between the authentication question response data and the generated first corresponding answer and second corresponding answer:
authenticating, by the at least one processor, the user requesting to process the event;
generating, by the at least one processor, an instruction to process the event; and
transmitting, by the at least one processor and via the communication interface, the instruction causing the event to be processed.

7. The method of claim 6, wherein the data is received from at least one internal source internal to an entity implementing the computing platform and one external source external to the entity implementing the computing platform.

8. The method of claim 7, wherein the data includes at least one of: current location information for the user based on global positioning system (GPS) data of a computing device associated with the user, event processing history of the user, and demographic data.

9. The method of claim 6, further including:
prior to dynamically generating the first authentication question and the second authentication question:
generating, by the at least one processor, a request for authentication information;
transmitting, by the at least one processor and via the communication interface, the request for authentication information;
receiving, by the at least one processor and via the communication interface, authentication information response data;
comparing, by the at least one processor, the received authentication information response data to pre-stored authentication information to determine whether the received authentication information response data matches the pre-stored authentication information; and
responsive to determining that the received authentication information response data does match the pre-stored authentication information, dynamically generating, by the at least one processor, the first authentication question and the second authentication question.

10. The method of claim 6, wherein the dynamically generated first authentication question and first corresponding answer are generated by the computing platform without input from the user.

11. One or more non-transitory computer-readable media storing instructions that, when executed by a computing platform comprising at least one processor, memory, and a communication interface, cause the computing platform to:
receive a request to process an event;
responsive to receiving the request to process the event, receive data from a plurality of sources;
dynamically generate, based on the received data from the plurality of sources and using one or more machine learning datasets, a first authentication question and first corresponding answer and a second authentication question and second corresponding answer for use in authenticating a user requesting the event processing prior to the request to process the event, the first authentication question and second authentication question being generated in real-time;
transmit the first authentication question and the second authentication question to a computing device;

receive, from the computing device, authentication question response data;

compare the authentication question response data to the generated first corresponding answer and second corresponding answer to determine whether a match exists between the received authentication question response data and the generated first corresponding answer and second corresponding answer, wherein determining whether a match exists includes determining whether the first corresponding answer and second corresponding answer were received in a particular sequence order;

responsive to determining that a match exists between the authentication question response data and the first generated corresponding answer and second corresponding answer:

authenticate the user requesting to process the event;
  generate an instruction to process the event; and
  transmit the instruction causing the event to be processed.

12. The one or more non-transitory computer-readable media of claim 11, wherein the data is received from at least one internal source internal to an entity implementing the computing platform and one external source external to the entity implementing the computing platform.

13. The one or more non-transitory computer-readable media of claim 12, wherein the data includes at least one of: current location information for the user based on global positioning system (GPS) data of a computing device associated with the user, event processing history of the user, and demographic data.

14. The one or more non-transitory computer-readable media of claim 11, further including instructions that, when executed, cause the computing platform to:

prior to dynamically generating the first authentication question and the second authentication question:
    generate a request for authentication information;
    transmit the request for authentication information;
    receive authentication information response data;
    compare the received authentication information response data to pre-stored authentication information to determine whether the received authentication information response data matches the pre-stored authentication information; and
    responsive to determining that the received authentication information response data does match the pre-stored authentication information, dynamically generating the first authentication question and the second authentication question.

15. The one or more non-transitory computer-readable media of claim 11, wherein the dynamically generated first authentication question and first corresponding answer are generated by the computing platform without input from the user.

* * * * *